US011356980B2

(12) United States Patent
Tarchala et al.

(10) Patent No.: US 11,356,980 B2
(45) Date of Patent: Jun. 7, 2022

(54) EVENT MANAGEMENT SERVER

(71) Applicant: Honda Motor Co., Ltd., Tokyo (JP)

(72) Inventors: Christopher John Tarchala, Torrance, CA (US); Mark M. Panoncialman, Costa Mesa, CA (US); Mark A. Blice, Huntington Beach, CA (US); Hanna Gee, Torrance, CA (US); Shinngaram Choi, Torrance, CA (US); Daniel Mark Tiet, Westminster, CA (US); Evan Sullivan, Culver City, CA (US); Ravi G. Advani, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 53 days.

(21) Appl. No.: 17/021,144

(22) Filed: Sep. 15, 2020

(65) Prior Publication Data

US 2022/0086800 A1 Mar. 17, 2022

(51) Int. Cl.
*H04W 4/00* (2018.01)
*H04M 1/663* (2006.01)
*H04W 72/02* (2009.01)
*H04W 4/029* (2018.01)
*H04W 64/00* (2009.01)
*H04W 84/18* (2009.01)

(52) U.S. Cl.
CPC ........... *H04W 72/02* (2013.01); *H04W 4/029* (2018.02); *H04W 64/003* (2013.01); *H04W 84/18* (2013.01)

(58) Field of Classification Search
CPC ... H04W 72/02; H04W 4/029; H04W 64/003; H04W 84/18
See application file for complete search history.

(56) References Cited

U.S. PATENT DOCUMENTS

| 8,099,316 | B2 | 1/2012 | Moukas et al. |
| 9,049,259 | B2 | 6/2015 | Rathod |
| 10,110,413 | B2 | 10/2018 | Schoen et al. |
| 10,217,162 | B2 | 2/2019 | Sion et al. |
| 10,445,840 | B2 | 10/2019 | Pei et al. |
| 2010/0241576 | A1 | 9/2010 | Beeri |
| 2013/0346170 | A1 | 12/2013 | Epstein et al. |

(Continued)

FOREIGN PATENT DOCUMENTS

| IN | 2011MU00661 A | 6/2011 |
| KR | 101165989 B1 | 7/2012 |

(Continued)

*Primary Examiner* — Erika A Washington
(74) *Attorney, Agent, or Firm* — Aaron Fong; American Honda Motor Co., Inc.

(57) ABSTRACT

A server and a method for event management is provided. The server selects a first event from a plurality of events based on an event selection criteria. The server further transmits a notification, including event data, to a plurality of user devices. The server further receives a first set of responses from a first set of user devices. The server further transmits a request to each of a plurality of end-devices. The request is for procurement of a set of resources required to host the selected first event. The server further receives confirmation information from one or more of the plurality of end-devices based on the transmitted request, and further transmits logistic information related to the selected first event to the first set of user devices based on the received confirmation information.

21 Claims, 9 Drawing Sheets

(56) References Cited

U.S. PATENT DOCUMENTS

| | | |
|---|---|---|
| 2014/0074629 A1 | 3/2014 | Rathod |
| 2014/0136441 A1 | 5/2014 | Agarawalla et al. |
| 2015/0046515 A1 | 2/2015 | Pei et al. |
| 2015/0186929 A1 | 7/2015 | Thies et al. |
| 2016/0132816 A1 | 5/2016 | Lush |
| 2016/0300253 A1 | 10/2016 | Kaufman |
| 2017/0193406 A1* | 7/2017 | Berman ............ G06Q 10/1095 |
| 2019/0073623 A1 | 3/2019 | Lush |
| 2020/0153766 A1* | 5/2020 | Parr .................... G06Q 10/101 |

FOREIGN PATENT DOCUMENTS

| | | |
|---|---|---|
| KR | 20180036072 A | 4/2018 |
| WO | 201677390 A1 | 5/2016 |

* cited by examiner

EVENT MANAGEMENT SERVER

BACKGROUND

Typically, organizations participate, organize, or sponsor different events for various reasons, for example, entertainment, social cause, educational purpose, workshop, advertisements, marketing, business development, etc. Generally, preparation and execution of any event may include a number of tasks that may be performed manually by people associated with the organizations. The preparation or the execution of the event may include manual coordination between multiple parties (for example organizers, participants, partners, or vendors) which may be cumbersome and time consuming. Therefore, there may be a need for a system that may provide coordination between multiple parties to effectively manage the event and/or measure insights from the event that may be beneficial for the organizations.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to an embodiment of the disclosure, a server for event management is provided. The server may include a memory storing event data related to a plurality of events. The server may further include circuitry which may be coupled with the memory and may select a first event from the plurality of events that may be indicated in the stored event data. The selection of the first event may be based on an event selection criteria. The circuitry may further transmit a notification to a plurality of user devices. The transmitted notification may include the event data related to the selected first event. The circuitry may further receive a first set of responses from a first set of user devices of the plurality of user devices based on the transmitted notification. The circuitry may further transmit a request to each of a plurality of end-devices based on the received first set of responses and the selected first event. The request may be for procurement of a set of resources required to host the selected first event. The circuitry may further receive confirmation information from one or more of the plurality of end-devices based on the transmitted request. The circuitry may further transmit logistic information related to the selected first event to the first set of user devices based on the received confirmation information.

According to another embodiment of the disclosure, a method for event management is provided. The method may include selecting a first event from a plurality of events based on an event selection criteria. The method may further include transmitting a notification to a plurality of user devices. The transmitted notification may include event data related to the selected first event. The method may further include receiving a first set of responses from a first set of user devices of the plurality of user devices based on the transmitted notification. The method may further include transmitting a request to each of a plurality of end-devices based on the received first set of responses and the selected first event. The request may be for procurement of a set of resources required to host the selected first event. The method may further include receiving confirmation information from one or more of the plurality of end-devices based on the transmitted request. The method may further include transmitting logistic information related to the selected first event to the first set of user devices based on the received confirmation information.

According to an embodiment of the disclosure, a user device is provided. The user device may include circuitry which may receive, from a server, a notification which comprises event data which is related to a first event from a plurality of events. The server may select the first event from the plurality of events based on an event selection criteria. The circuitry may further transmit, to the server, a response to participate in the selected first event based on the received notification. The circuitry may further receive, from the server, logistic information related to the selected first event, based on the transmitted response.

Figure 1:
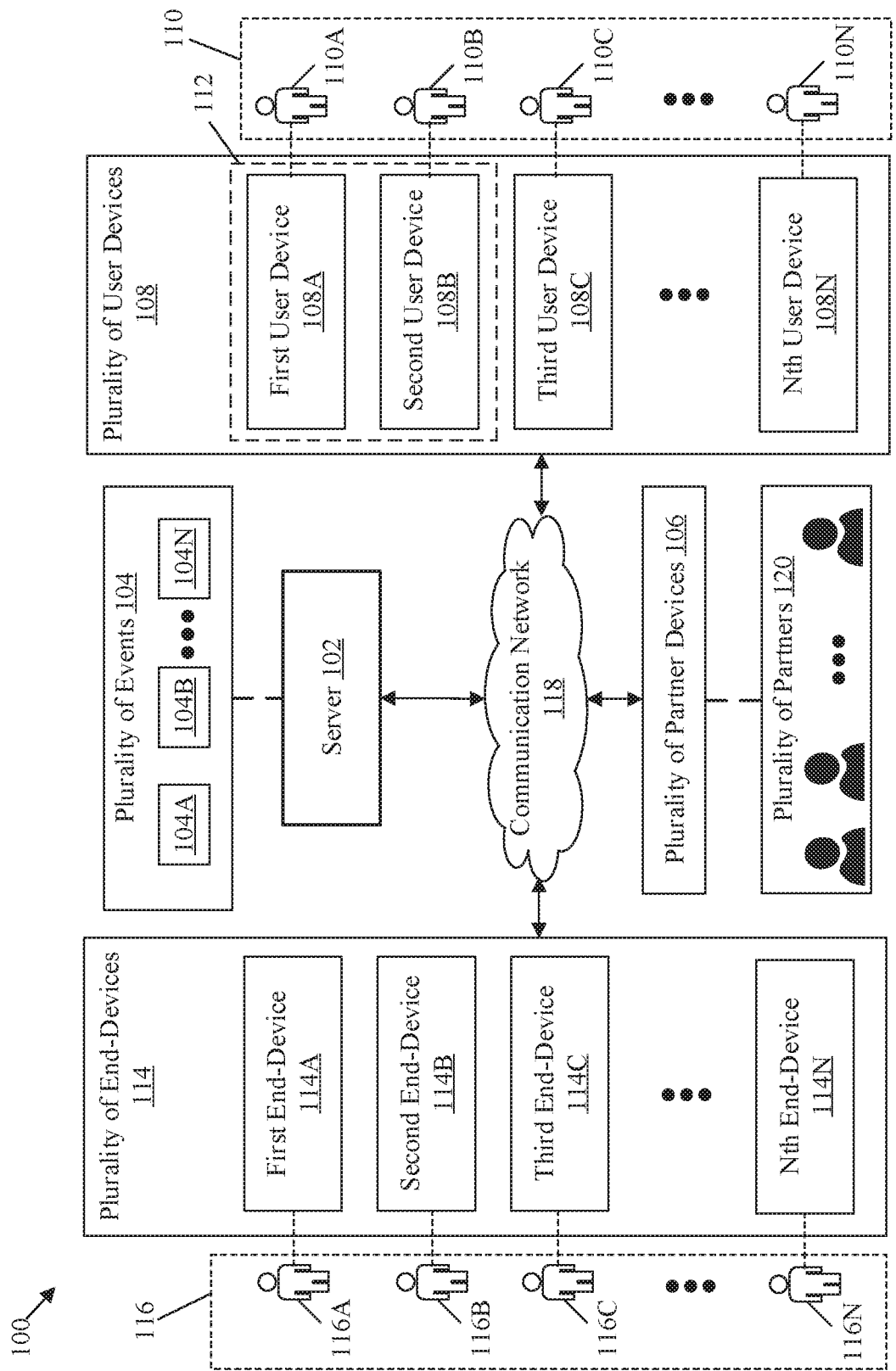
FIG. 1 is a block diagram that illustrates an exemplary network environment for event management, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in a disclosed server for event management. Exemplary aspects of the disclosure may provide a server (for example a unified platform server) that may include memory configured to store event data (such as a geo-location, a title, a date-time, an organizer of the event, etc.) related to a plurality of events (such as an organization event, a community event, a social event, an educational event, a health event, etc.). The plurality of events may be organized, sponsored, facilitated, or hosted by a plurality of organizers associated with the server. The disclosed server may select a first event from the plurality of events indicated by the stored data. The disclosed server may further determine a plurality of users (such as potential participants or customers) for the selected first event and transmit a notification for participation to a plurality of user devices associated with the determined plurality of users. The disclosed server may further transmit a request, for procurement of a set of resources (such as a venue, power equipment, furniture, hardware, software, stationary items, conference room, etc.) required to host the selected first event at a particular location. The request may be transmitted to a plurality of end-devices associated with a plurality of associates (such as vendors, dealers, suppliers, etc.). The disclosed server may further transmit logistic information (for example event details, venue location, date-time, navigation information, or like, related to the selected first event) to the plurality of user devices, based on confirmation information about the available set of resources received from one or more of the plurality of end-devices of the associates.

Therefore, the disclosed server may automatically perform plurality of tasks (i.e. selection of event, determination of users, procurement request, confirmation reception, or logistic transmission) for the effective event management based on collaboration between multiple parties (for example, organizations, partners, end-users, or associates). The disclosed server may further monitor and store participation information about the plurality of users (or devices) who participated in the plurality of events. The participation information about the plurality of users may be used to determine or retain potential customers/users of the products/services that may be provided by the organization or the partners associated with the server. The disclosed server may further calculate rewards for the participants (or users) of the plurality of events based on the participation information, to further enhance or retain the participation in future events. Based on the calculation of the participation information, the disclosed server may also evaluate events, their specific locations, participants, content, or other factors to get best returns (such as revenue, market publicity, potential customer retention, etc) for the organization or for the partners associated with the server. The disclosed server may consolidate all digital interactions between multiple parties to effectively manage the events associated with the organization or the partners.

Reference will now be made in detail to specific aspects or features, examples of which are illustrated in the accompanying drawings. Wherever possible, corresponding or similar reference numbers will be used throughout the drawings to refer to the same or corresponding parts.

FIG. 1 is a block diagram that illustrates an exemplary network environment for event management, in accordance with an embodiment of the disclosure. There is shown a network environment diagram 100 which may include a server 102. There is further shown a plurality of events 104 for which event data may be stored in the server 102. The plurality of events 104 may be created, initiated, or communicated by a plurality of partner devices 106 associated with the plurality of partners 120. With reference to FIG. 1, there is further shown a plurality of user devices 108 that may be associated with a plurality of users 110. For example, a first user device 108A of the plurality of user devices 108 may be associated with a first user 110A of the plurality of users 110. A second user device 108B may be associated with a second user 110B of the plurality of users 110, and so on. With reference to FIG. 1, there is further shown a first set of user devices 112 of the plurality of user devices 108. There is further shown a plurality of end-devices 114 that may be associated with a plurality of associates 116. The server 102, the plurality of partner devices 106, the plurality of user devices 108, and the plurality of end-devices 114 may be connected through a communication network 118, as shown in FIG. 1.

The server 102 may include suitable logic, circuitry, interfaces, and/or code that may be configured to manage each of the plurality of events 104. The server 102 may be configured to handle a collaboration between the plurality of partner devices 106, the plurality of user devices 108, and the plurality of end-devices 114 of the plurality of associates 116 for the event management. The management of each of the plurality of events 104 may include, but is not limited to, reception of event data from partners, determination of participants for an event, transmission of notification to the participants, determination of resources required to host the event, transmission of requests for procurement of the determined resources to associates, transmission of event related instructions to the participants, monitor participation information of each of the participants in the plurality of events 104, or determination of reward information for the participants. In an embodiment, the plurality of partner devices 106, the plurality of user devices 108, and the plurality of end-devices 114 may be registered to the server 102 for the management of the plurality of events 104. In an embodiment, the server 102 may be associated with an organization which may be included in a plurality of partners 120 associated with the plurality of partner devices 106. In another embodiment, the organization of the server 102 may be associated with the plurality of partners. In an embodiment, the plurality of partner devices 106, the plurality of user devices 108, and the plurality of end-devices 114 may communicate with the server 102 through a web application (i.e. associated with server 102) installed on each of the plurality of partner devices 106, the plurality of user devices 108, and the plurality of end-devices 114. In an embodiment, each of the plurality of partner devices 106, the plurality of user devices 108, and the plurality of end-devices 114 may communicate with the server 102 using corresponding secured credentials (for example login identification (ID) and/or password) provided by the server 102.

Examples of the server 102 may include, but are not limited to, a computing device, a mainframe machine, a computer work-station, a smartphone, a cellular phone, a mobile phone, and/or any electronic device with data processing and networking capabilities. Other examples of the server 102 may include, but are not limited to, an event server, a database server, a file server, a web server, a media server, a content server, an application server, a mainframe server, a cloud server, or other types of servers. In one or more embodiments, the server 102 may be implemented as a plurality of distributed cloud-based resources.

The plurality of events 104 may include the first event 104A, a second event 104B, and an Nth event 104N. Each event of the plurality of events 104 may be a social gathering for a purpose, for example, of one or more of the plurality of users 110. Each event of the plurality of events 104 may correspond to, but is not limited to, a community event, a social event, a sport event, an educational event, a health event, a corporate event, a business development event, a launch event, a trade-show event, or an award event. For example, the first event 104A may be a robotic event, the second event 1046 may be cleaning event, and the Nth event 104N may be a health check-up event. The first event 104A (i.e. the robotic event) may correspond to the educational event, the second event 1046 (i.e. the cleaning event) may correspond to the community event, and the Nth event 104N (i.e. the health check-up event) may correspond to the health event.

Each of the plurality of partners 120 may correspond to a person, an organization, an institute, a facility, or a service provider that may create event data related to an event that may be hosted, sponsored, facilitated, or organized. For example, the plurality of partners 120 may be related to, but not limited to, schools, institutions, universities, corporates, government organization, non-government organization, health-care organization, manufacturing organization, museums, or any community. The plurality of events 104 may be the upcoming events or scheduled events for future. The plurality of partners 120 may provide information about the type of the event, the geo-location of the event, the timing of the event, or the type of participants required for the event, to the server 102, via the corresponding plurality of partner devices 106. In some embodiments, the plurality of partner devices 106 may create the event data related to a new event based on inputs received from the plurality of partners 120, and further transmit information about the new event to the server 102. The event newly created (not shown) by the plurality of partner devices 106 may be different from the plurality of events 104 about which the information may be stored in the server 102. The server 102 may further update the stored event data (related to the plurality of events 104) based on the received information associated with the new event. In some embodiments, an organization which may be an owner of the server 102 may have partnered with the plurality of partners 120 to receive the event data about a particular event or host the event in collaboration.

The plurality of partner devices 106 may include suitable logic, circuitry, or interfaces that may be configured to receive information about a particular event (or new event) from the plurality of partners 120. The plurality of partner devices 106 may create the event data for the new event, and transmit the event data to the server 102. The server 102 may further update the stored event data (i.e. related to the plurality of events 104) based on the event data received for the new event from one of the plurality of partner devices 106. In an embodiment, the plurality of partner devices 106 may be further configured to receive information about the event to be scheduled, from the server 102. The information may indicate, for example, selection to the event, number of participants, selected location, date-time or resources to host the event. The plurality of partner devices 106 may render the received information about the selected or scheduled event to the plurality of partners 120. Examples of the plurality of partner devices 106 may include, but are not limited to, a computing device, a mainframe machine, a computer work-station, a smartphone, a cellular phone, a mobile phone, a personal digital assistance (PDA) device, and/or any electronic device with display and communication capabilities.

The plurality of user devices 108 may include suitable logic, circuitry, interfaces, and/or code that may be configured to receive the notification about the selected first event 104A from the server 102. Each of the first set of user devices 112 of the plurality of user devices 108 may transmit a response (for example acceptance for the event) to the server 102 based on the received notification. Each of the plurality of user devices 108 may be associated with the plurality of users 110. The plurality of users 110 may be a plurality of subscribers (or customers) who may have subscribed to a service (i.e. offered by the organization of the server 102) for being notified about the events to be hosted at a specific geo-location. In some embodiments, one or more of the plurality of users 110 may be customers of products or services provided by the organization or by the plurality of partners 120 associated with the server 102. In some other embodiments, one or more of the plurality of users 110 may be employees of the organization or the plurality of partners 120 associated with the server 102. Examples of each of the plurality of user devices 108 may include, but is not limited to, a smartphone, a cellular phone, a mobile phone, in-vehicle infotainment (IVI) system, human-machine interface (HMI), Head-up Display (HUD), an automotive dashboard, a gaming device, a computing device, a mainframe machine, a computer work-station, a portable consumer electronic (CE) device, and/or any electronic device with data processing and networking capabilities.

The plurality of end-devices 114 may include suitable logic, circuitry, interfaces, and/or code that may be configured to receive the request for procurement of a set of resources to host or organize the selected event from the plurality of events 104. The request may be received from the server 102. The request may be to provide the set of resources at a particular venue (for example a building) selected to host the event. One or more of the plurality of end-devices 114 may further transmit confirmation information in response to the received request to the server 102. The confirmation information may include information about acceptance or rejection of the request for procurement of the set of resources. The plurality of end-devices 114 may include a first end-device 114A, a second end-device 1146, a third end-device 114C, an Nth end-device 114N as shown in FIG. 1. Each of the plurality of end-devices 114 may be associated with the plurality of associates 116. For example, the first end-device 114A may be associated with a first associate 116A, the second end-device 1146 may be associated with a second associate 116B, and so on. The plurality of associates 116 may include a plurality of vendors, dealers, or suppliers that may provide or manage the set of resources required to host the selected event of the plurality of events 104. The organization (or owner) associated with the server 102 may have partnered with the plurality of associates 116 for the procurement of the set of resources required to host each event of the plurality of events 104. Examples of the each of the plurality of end-devices 114 may include, but is not limited to, a smartphone, a cellular phone, a mobile phone, a computing device, a mainframe machine, a computer work-station, and/or any electronic device with data processing and networking capabilities.

The communication network 118 may include a communication medium through which the server 102, the plurality of partner devices 106, the plurality of user devices 108, and the plurality of end-devices 114 may communicate with each other. The communication network 118 may be one of a wired connection or a wireless connection. Examples of the communication network 118 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 118 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, information associated with a plurality of events 104 (such as the first event 104A, the second event 104B, and the Nth event 104N) may be received from the plurality of partner devices 106 that may be associated with the plurality of partners 120. The server 102 may be configured to store the received information as the event data related to the plurality of events 104. The stored event data related to each event of the plurality of events 104 may include one or more of a geo-location of an event, a title of the event, a type or theme of the event, date-time information of the event, a plurality of resources required to host the event, a group of users to be invited for the event, information about an organizer of the event, user profile information of the participants (i.e. the plurality of users 110) to be targeted or invited for the event. The geo-location of the event may indicate a particular place (for example a building or a room) where the event may take place or hosted. The title of the event may correspond to a name of the event and/or may provide a broader perspective about the event. The type of event may correspond to a category or a genre of the event. The category of the event may be, but is not limited to, a community event, a social event, a sport event, an educational event, a health event, a corporate event, a business development event, a launch event, a trade-show event, or an award event. The date-time information of the event may include a date and time when the event may be hosted. The plurality of resources required to host the event may include information about the physical resources (such as, but not limited to, a physical space, a hardware equipment, required software, furniture, eatables, clothing items, stationary items, etc.) that may be required to host the event. The information about the organizer of the event may include, but is not limited to, name, contact details, and other data about the organizers of the event.

The server 102 may be configured to select the first event 104A from the plurality of events 104. The first event 104A may be selected from the plurality of events 104 based on an event selection criteria. The event selection criteria may be based on the at least one of the date-time information associated with each of the plurality of events 104, historical information associated with each of the plurality of events 104, or geo-location information associated with each of the plurality of events 104. The event selection criteria and selection of the first event 104A are further described, for example, in FIG. 3.

Based on the selection of the first event 104A, the server 102 may be further configured to determine the plurality of users 110 as participants (or potential customers) for the selected first event 104A. In an embodiment, the geo-location of the selected first event 104A may be determined, and all the subscribers or participants present in within a distance range (for example in Kilometer or miles) of the determined geo-location of the selected first event 104A may be determined as the plurality of users 110. In another embodiment, the determination of the plurality of users 110 may be based on the user profile information (for example demographic or interests) associated with each of the plurality of users 110. The server 102 may be further determined to transmit the notification to the plurality of user devices 108 associated with the plurality of users 110. The transmitted notification may include the event data related to the selected first event 104A. The details about the notification are described, for example, in FIGS. 3 and 4.

The server 102 may be further configured to receive a first set of responses from the first set of user devices 112 of the plurality of user devices 108 based on the transmitted notification. For example, the first set of user devices 112 may include the first user device 108A associated with the first user 110A and the second user device 108B associated with the second user 110B. The first set of responses may include the acceptance of a first set of users (related to the first set of user devices 112) to become participants in the selected first event 104A. In some embodiments, the first set of users may be same as the plurality of users 110. In some other embodiments, the first set of users may be a subset of the plurality of users 110.

The server 102 may be further configured to determine a set of resources required to host the selected first event 104A. The determination of the set of resources may be based on the received first set of responses and the event data related to the selected first event 104A. In an embodiment, the event data related to the selected first event 104A may include the set of resources required to host the selected first event 104A. In some embodiments, the server 102 may analyze the event data for the selected first event 104A and the received first set of responses (for example number of acceptance received) to determine the set of resources required to host the selected first event 104A. The determination of the set of resources is described, for example, in FIG. 3.

The server 102 may be further configured to transmit a request to each of the plurality of end-devices 114 associated with the plurality of associates 116 based on the determined set of resources. The request may be for procurement of the determined set of resources, and may be further based on the received first set of responses and the selected first event 104A. In an embodiment, the request may include a name and a number of resources required from a particular associate of the plurality of associates 116. In some embodiments, each request may contain same name and the number of resources required from each of the plurality of associates 116. In some other embodiments, the request may be customized for each of the plurality of associates 116. In some embodiments, the request may be to provide the set of resources to a particular venue (i.e. selected to host the selected first event 104A). The details about the transmitted request are described, for example, in FIG. 5. The server 102 may be further configured to receive confirmation information from one or more of the plurality of end-devices 114 based on the transmitted request. The confirmation information may include information about acceptance or rejection of the transmitted request for procurement of the determined set of resources required to host the selected first event 104A.

Based on the received confirmation information, the server 102 may be further configured to transmit logistic information related to the selected first event 104A to the first set of user devices 112. The logistic information may include, but is not limited to, a geo-location of the selected first event 104A, navigation information of the selected first event 104A, date-time information of the selected first event 104A, invitation information of the selected first event 104A, or a first set of instructions for the selected first event 104A. The logistic information is further described, for example, in FIGS. 3, 6, and 7.

Figure 2:
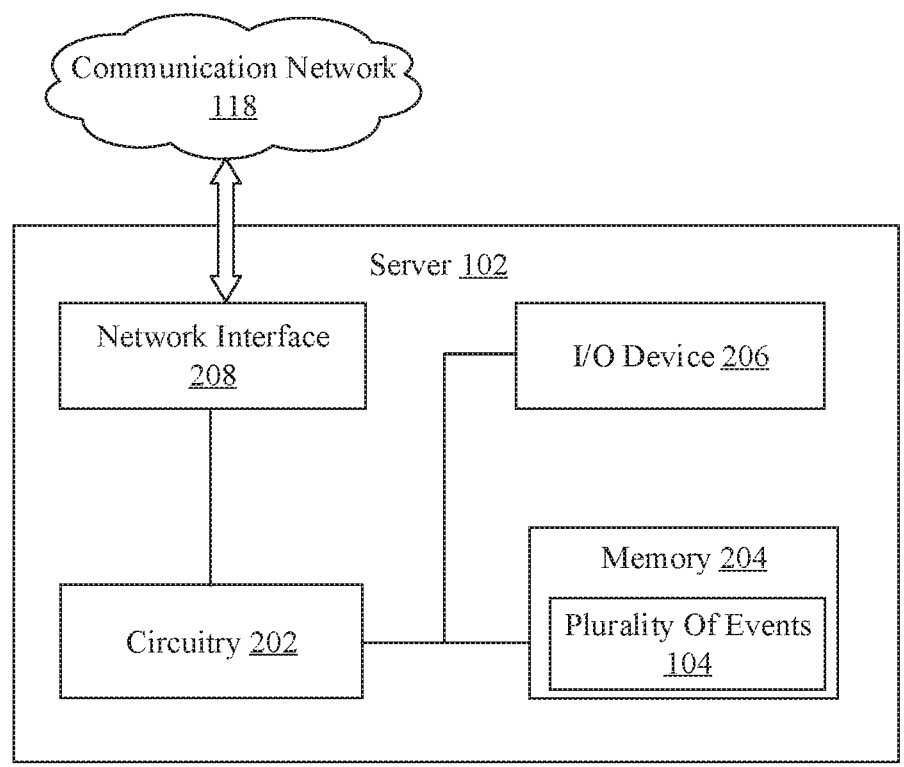
FIG. 2 is a block diagram that illustrates an exemplary server of FIG. 1 for the event management, in accordance with an embodiment of the disclosure.

FIG. 2 is a block diagram that illustrates an exemplary server of FIG. 1 for event management, in accordance with an embodiment of the disclosure. FIG. 2 is explained in conjunction with elements from FIG. 1. With reference to FIG. 2, there is shown a block diagram 200 of the server 102. The server 102 may include circuitry 202, a memory 204, an I/O device 206, and a network interface 208. The circuitry 202 may be connected to the memory 204, the I/O device 206, and the network interface 208, through wired or wireless connections.

The circuitry 202 may include suitable logic, circuitry, and/or interfaces that may be configured to execute a set of operations, such as, but not limited to, selection of the first event 104A from the plurality of events 104, transmission of the notification to the plurality of user devices 108, reception of the first set of responses from the first set of user devices 112, transmission of the request to each of the plurality of end-devices 114, reception of the confirmation information, and/or transmission of the logistic information. The circuitry 202 may include any suitable special-purpose or general-purpose computer, computing entity, or processing device including various computer hardware or software modules and may be configured to execute instructions stored on any applicable computer-readable storage media (for example the memory 204). The circuitry 202 may be implemented based on a number of processor technologies known in the art. For example, the circuitry 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. The circuitry 202 may include any number of processors configured to, individually or collectively, perform any number of operations of the server 102, as described in the present disclosure. Examples of the circuitry 202 may include a Central Processing Unit (CPU), a Graphical Processing Unit (GPU), an x86-based processor, an x64-based processor, a Reduced Instruction Set Computing (RISC) processor, a Complex Instruction Set Computing (CISC) processor, and/or other hardware processors.

The memory 204 may include suitable logic, circuitry, interfaces, and/or code that may be configured to store the set of instructions executable by the circuitry 202. The memory 204 may be configured to store the event data related to the plurality of events 104. The memory 204 may be further configured to store the user profile information and reward information of the plurality of users 110. The memory 204 may be further configured to store a format of the notification and the request to be transmitted to the plurality of user devices 108 and the plurality of end-devices 114, respectively. In some embodiments, the memory 204 may also store information related to the set of resources required to host a corresponding event. In some embodiments, the memory 204 may store contact details (for example a name, a phone number, or an address) of the plurality of users 110, the plurality of associates 116, and the plurality of partners 120. The memory 204 may also store contact details (for example IP or MAC address) associated with the plurality of partner devices 106, the plurality of user devices 108, and the plurality of end-devices 114. Examples of implementation of the memory 204 may include, but are not limited to, Random Access Memory (RAM), Read Only Memory (ROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to may receive user inputs and generate outputs in response to the received user inputs. The I/O device 206 may receive information associated with a new event from a user of the server 102. For example, such user may be an executive of the organization associated with or handling the server 102 for the event management. The I/O device 206 may include various input and output devices, may be configured to communicate with the circuitry 202. Examples of the I/O device 206 may include, but are not limited to, a touch screen, a keyboard, a mouse, a joystick, a microphone, a display device, a speaker, and/or an image sensor.

The network interface 208 may include suitable logic, circuitry, and interfaces that may be configured to facilitate communication between the circuitry 202, the plurality of partner devices 106, the plurality of user devices 108, and the plurality of end-devices 114 via the communication network 118. The network interface 208 may be implemented by use of various known technologies to support wired or wireless communication of the server 102 with the communication network 118. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 208 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

Although in FIG. 2, it is shown that the server 102 includes the circuitry 202, the memory 204, the I/O device 206, and the network interface 208; however, the disclosure may not be so limiting and the server 102 may include more or less components to perform the same or other functions of the server 102. Details of the other functions and the components have been omitted from the disclosure for the sake of brevity. The functions or operations executed by the server 102, as described in FIG. 1, may be performed by the circuitry 202. Operations executed by the circuitry 202 are described, for example, in the FIGS. 3, 4, 5, 6, 7, 8, and 9.

Figure 3:
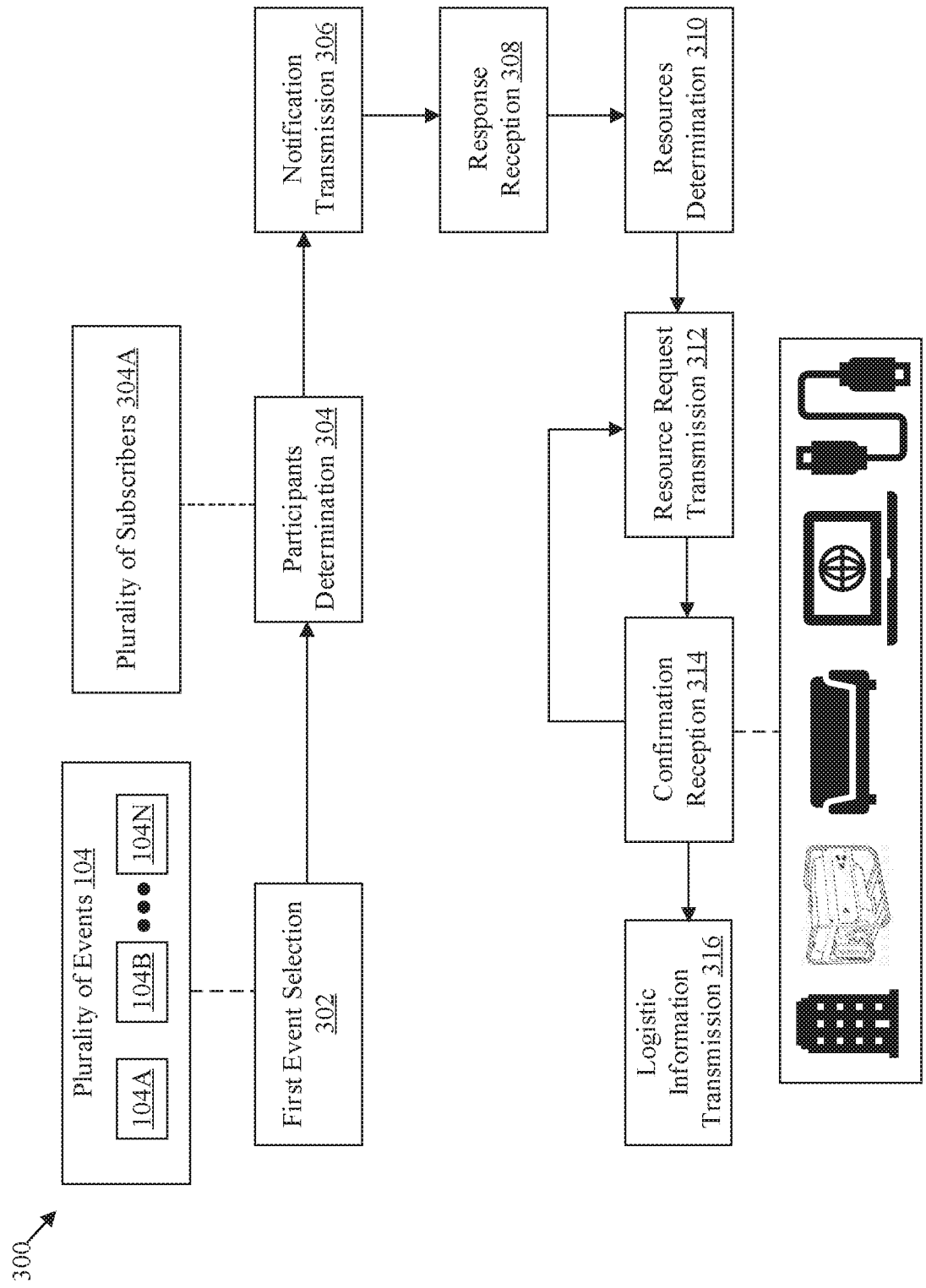
FIG. 3 is a diagram that illustrates exemplary operations for the event management by the server 102 of FIG. 1, in accordance with an embodiment of the disclosure.

FIG. 3 is a diagram that illustrates exemplary operations for event management by the server 102 of FIG. 1, in accordance with an embodiment of the disclosure. FIG. 3 is explained in conjunction with elements from FIG. 1 and FIG. 2. With reference to FIG. 3, there is shown a block diagram 300 of exemplary operations from 302 to 316 performed by the server 102 or the circuitry 202 for the management of events.

At 302, an event selection operation may be performed. In an embodiment, the circuitry 202 may be configured to perform the event selection operation to select a first event (for example the first event 104A) from the plurality of events 104, as indicated by the stored event data related to the plurality of events 104. The event data related to the plurality of events 104 may be stored in the memory 204 of the server 102. The stored event data related to each of the plurality of events 104 may include, but is not limited to, a geo-location of an event, a title of the event, a type of the event, date-time information of the event, a plurality of resources required to host the event, information about a group of users to be invited for the event, or information about an organizer of the event. The plurality of events 104 may be events which have been scheduled by the plurality of partners 120. In an embodiment, one of the plurality of partners 120 by an owner of or directly associated with the server 102. The other of the plurality of partners 120 may be associated or partnered with the owner of the server 102.

The geo-location of the event may indicate a particular place where the event may take place or hosted. In some embodiments, the location may be an absolute location or a relative location. The absolute location may include the exact address where the corresponding event is scheduled to be hosted. For example, the absolute location may be 'Floor-X, Tower-Y, Z-Street, City-A, State-B, Country-C'". The relative location may correspond to a location that may not be an exact address, but may provide an indication of venue to the participants. For example, the relative location may be name of a city or a street. The relative location may be included in the event data for a particular event, when the exact venue address may not be finalized by an organizer, initially before the event.

In case, the relative location is stored in the event data, the circuitry 202 may be configured to determine the absolute location based on the relative location. The circuitry 202 may determine a plurality of venues in the distance range from the relative location, and determine a first location (or venue) for hosting the selected first event 104A from the determined plurality of venues, and based on other factors (like availability and capacity of the venue). For example, if the relative location is provided as 'City-A', the determined absolute location may be 'Community Center-1' located in the 'City-A'. Therefore, the disclosed server 102 may be able to determine the absolute location to host the event in case only the relative location is provided in the stored event data related to the event.

The title of the event may correspond to the name of the event and may provide a broader perspective about the event. The type of event may correspond to the category or genre of the event. The category of the event may be, but not limited to, a community event, a social event, a sport event, an educational event, a health event, a corporate event, a business development event, a launch event, a trade-show event, or an award event. The date-time information of the event may include the date and time when the event may be hosted. The plurality of resources required to host the event may include a list of resources (such as a physical space like conference hall or meeting room; a hardware equipment, required software, furniture, eatables, clothing items, stationary items, etc.) that may be required in the event. The information about the group of users to be invited for the event, may include the information about target users or customers (for example the plurality of users 110 to whom the notification about the selected first event 104A may be sent, as described, for example, at steps 304 and 306 in FIG. 3). The information about the organizer of the event may include the name, the contact details, and other relevant data about the organizers of the event.

The circuitry 202 may be configured to select the first event 104A from the plurality of events 104 based on an event selection criteria. The event selection criteria may be based on, but is not limited to, date-time information associated with each of the plurality of events 104, historical information associated with each of the plurality of events 104, or geo-location information associated with each of the plurality of events 104. The date-time information, the historical information, and the geo-location information of the plurality of events 104 may be stored in the event data in the memory 204. In some embodiments, the date-time information, the historical information, and the geo-location information may be provided by the plurality of partner devices 106 corresponding to the plurality of events 104. The date-time information associated with the event may provide the location at which the corresponding event may be hosted. The historical information associated with each of the plurality of events 104 may include, but is not limited to, a feedback or ratings of the participants of same event hosted in past (say a year or few months ago), a revenue generated by the same event hosted in past, the number of participants in the same event hosted in past, a success or failure data generated for the same event hosted in past, or logistic difficulties/challenges faced while the same event was hosted in past. The geo-location information associated with each of the plurality of events 104 may indicate the location or venue where the event was hosted.

In an embodiment, the date-time information of each of the plurality of events 104 may be compared and sorted according to an ascending order. The circuitry 202 may select the event on top of a sorted list as the first event 104A. As an example, the plurality of events 104 may contain two events (a 'Robo-Mania' event and a 'Community-Cleanup' event) with date-time information for 'Robo-Mania' event being '2020-05-14|10:00', and the date-time information for 'Community-Cleanup' event being '2020-06-12|10:00'. In such instance, the 'Robo-Mania' event may be selected as the first event 104A as the "Robo-Mania' event is scheduled to be hosted before the 'Community-Cleanup' event.

In another embodiment, the circuitry 202 may determine past dates of similar events from the event data, to select the first event 104A from the plurality of events 104 to be scheduled. The circuitry 202 may determine a difference between the past date of hosting the similar event and the current date-time information of the similar event (to be hosted), to identify the type of the event that may not be hosted from a long time (say in last 1 year or in last few months) based on a predefined time threshold for selection. Thus, the circuitry 202 may select such event as the first event 104A (from the plurality of events 104) which may not be hosted in past within the predefined time threshold, therefore, to provide equal opportunity to each event in the plurality of events 104 and the corresponding partner to host the selected event.

In another embodiment, the circuitry 202 may select the first event 104A from the plurality of events 104 based on the geo-location indicated to host the corresponding event. The geo-location of the event may correspond to a name or an address of the venue to host the event, based on a comparison of the geo-location and prestored map data. For example, the circuitry 202 may determine certain factors related to the geo-location (or venue) of the event, for example, availability of the venue, size or capacity of the venue to host the event, past feedback of a vendor of the venue, pending payments, discounts offered by the vendor of the venue, or availability of public transport to reach the venue), as the event selection criteria, to select the first event 104A from the plurality of events 104 indicated in the stored event data.

In another embodiment, the circuitry 202 may retrieve the historical information of each of the plurality of events 104 from the event data, and compare the retrieved historical information of each of the plurality of events 104 with each other. The circuitry 202 may select the first event 104A from the plurality of events 104 based on the comparison of the historical information (as the event selection criteria). In accordance with the first example, the revenue generated last time (i.e. historical information) during the 'Community-cleanup' event may be less that the revenue generated during the robotic 'Robo-Mania' event in past. In such instance, the circuitry 202 may select the Robo-Mania event as the first event 104A from the plurality of events 104. In another embodiment, the circuitry 202 may select the first event 104A from the plurality of events 104 based on the past feedback/rating (i.e. historical information) of the participants stored in the memory 204. For example, in case the past feedback of the first event 104A is better than others of the plurality of events 104, then the circuitry 202 may select the first event 104A because the probability of getting higher ratings, revenue or success may be high again. Hence, the disclosed server 102 may be capable enough to automatically select the first event 104A from the plurality of events 104 based on one or combination of variety of conditions (i.e. event selection criteria's), without user intervention.

At 304, participants determination operation may be performed. In the participants determination operation, the circuitry 202 may determine the plurality of users 110, as participants, for the selected first event 104A. The plurality of users 110 may be determined from a plurality of subscribers 304A, as shown in FIG. 3. The plurality of subscribers 304A may correspond to users or participants from different geo-locations and may have signed up to be a participant in one or more events of the plurality of events 104 that may be hosted at different locations. In an embodiment, the plurality of subscribers 304A may have signed up to the server 102 for the event participation via mobile applications or web interfaces. In an example, the mobile application or web application may belong to the organization who may be organizing the selected first event 104A of the plurality of events 104 or belong to the organization which owns the server 102. In an example, the mobile application or the web application may belong to one of the plurality of partners 120 who may be organizing the selected first event 104A.

In some embodiments, the plurality of subscribers 304A may sign-up using third-party or social media accounts. In such instances, the plurality of subscribers 304A may agree to share some information from the third-parties or the social media accounts with the organization of the server 102. In some embodiments, the organization of the server 102 may have partnered with a plurality of businesses such as, but not limited to, e-commerce, ride rentals, educational services, healthcare facilities, charity facilities, banking services, financial services, sports facilities, corporates, manufacturing units, etc. The plurality of subscribers 304A may be associated with the plurality of businesses (i.e. the plurality of partners 120) registered or partnered with the organization or owner of the server 102. The mobile application owned by the server 102 may also include services provided by the partnered plurality of businesses. For example, the plurality of subscribers 304A (or the plurality of users 110) may book a vehicle on rent for travel, through the web or the mobile application of the server 102, installed on the corresponding plurality of user devices 108. The vehicle rent service may be provided by the organization of the server 102. In an embodiment, a subscriber or user of a partner may coordinate with another partner through the web application of the server 102. For example, a subscriber of a health-care organization may avail the vehicle rental service to rent a vehicle, through the web application of the server 102. Hence, the mobile or the web application communicatively coupled with the server 102 may act as a 'all-in-one' service provider that may provide multiple services through the collaboration with the plurality of partners 120 and the plurality of users 110, via the plurality of partner devices 106 and the plurality of user devices 108, respectively. This may increase the real-time engagement with each of the plurality of subscribers 304A, and hence more date about each of the plurality of subscribers 304A may be accessed and/or stored by the server 102 to provide an effective event management. Further, the disclosed server 102 may provide an enhanced opportunity to the plurality of subscribers 304A to access products or services provided by the plurality of partners 120 or by the organization of the server 102.

In some embodiments, the circuitry 202 may generate a user profile of each of the plurality of subscribers 304A after the plurality of subscribers 304A sign up on the mobile application or the web application. The user profile may include information (such as the user profile information) about the corresponding subscriber and may be stored in the memory 204. Such information may include but is not limited to, a name of the subscriber, a date of birth (or age) of the subscriber, a gender of the subscriber, a location of the subscriber, contact details, an education details of the subscriber, or interest/hobbies of the subscriber. In case, the third-party or the social media accounts have been used to sign-up, the user profile may be generated based on the data shared by the third-parties or social media company.

The circuitry 202 may be configured to determine the plurality of users 110 for participation in the selected first event 104A. In an embodiment, the circuitry 202 may determine the plurality of users 110 from the plurality of subscribers 304A based on the geo-location of the selected first event 104A and the location of plurality of subscribers 304A stored in the user profile information. In an example, the circuitry 202 may determine the plurality of subscribers 304A whose stored or current location is within a pre-defined threshold distance (for example within few Kilometers or Miles) from the location 'A', where the selected first event 104A may be scheduled to be hosted. The circuitry 202 may determine a set of subscribers (as the plurality of users 110) from the plurality of subscribers 304A who may be within pre-defined threshold distance (for example 20 miles) from the location 'A'. In some embodiments, the circuitry 202 may determine the category or type of the selected first event 104A from the event data, and compare the determined category/type with the educational details or the interest/hobbies (i.e. user profile information) of the plurality of subscribers 304A to determine the plurality of users 110 for the selected first event 104A. For example, if the selected first event 104A is for "Robotic" event, then the plurality of users 110 may be selected who may be interested or may have the educational background in robotics domain as per corresponding the user profile information. Similarly, the circuitry 202 may determine the plurality of users 110 based on the event data about the selected first event 104A and the user profile information (like age gender) of the plurality of subscribers 304A, to target correct segment of people as participant for the selected first event 104A. The circuitry 202 may analysis combination of parameters (for example location, age, gender, educational details, or interest) in the user profile information to determine the plurality of users 110 from the plurality of subscribers 304A for the participation in the selected first event 104A. For example, one or more of the plurality of users 110 may be directly associated with one of the plurality of partners 120, and may be unknown to the organization of the server 102. Therefore, the disclosed collaboration between the plurality of partners 120 and the server 102, may allow the organization of the server 102 to know and approach such unknown users and their corresponding user profile information. Such users who may be unknown to the organization of the server 102 may be the participants for the selected first event 104A, and may become potential customers of the products or services provided by the organization or other partners.

In an embodiment, the circuitry 202 may be further configured to determine the plurality of user devices 108 associated with the determined plurality of users 110. Each of the plurality of user devices 108 may be associated with corresponding user of the plurality of users 110. In some embodiments, the plurality of user devices 108 may be the devices from which the plurality of users 110 may have signed up or registered to the server 102. Each of such devices from which the plurality of users 110 have signed up may have unique identifiers (such as MAC address, IP address, etc.) that may be stored with the user profile information in the memory 204 of each subscriber during the sign-up process. The circuitry 202 may determine the unique identifiers and further determine the plurality of user devices 108 for the selected plurality of users 110, based on the determined unique identifiers. In some embodiments, the circuitry 202 of the server 102 may receive the user profile information about each of the plurality of users 110 from the corresponding plurality of user devices 108.

At 306, a notification transmission operation may be executed. In the notification transmission operation, the circuitry 202 may be configured to transmit a notification to the determined plurality of user devices 108 associated with the plurality of users 110 (as participants for the selected first event 104A). The transmitted notification may include the event data related to the selected first event 104A. The transmitted notification may inform the plurality of users 110 about the selected first event 104A that may be scheduled to be hosted in near future and may request the plurality of users 110 for their participation in the selected first event 104A. The details about the transmitted notification are described, for example, in FIG. 4.

At 308, a response reception operation may be performed. In the response reception operation, the circuitry 202 of the server 102 may be configured to receive a first set of responses from the first set of user devices 112 of the plurality of user devices 108 (i.e. to which notification may be sent). The first set of user devices 112 may be associated with the first set of users of the plurality of users 110. The first set of responses may be received in response to the transmitted notification (at step 306). In some embodiments, each of the plurality of users 110 may respond to the received notification via the corresponding user device. In such instance, the first set of users may be equal to the plurality of users 110. In some instances, the response may be received from some users of the plurality of users 110 to whom the notification may be transmitted. In such instance, the first set of users may be a subset of the plurality of users 110. The received first set of responses may correspond to either acceptance or rejection for the participation by each of the first set of users in the selected first event 104A.

In an embodiment, the circuitry 202 may be further configured to filter the first set of users (i.e. from whom the responses may be received) to a second set of users for participation in the selected first event 104A. Such filtration of the participants may be based on the event data related to the selected first event 104A and the user profile information of each of first set of users retrieved from the memory 204. The circuitry 202 may filter the first set of users (or the first set of user devices 112) to the second set of users (or a second set of user devices) to accept or reject the participation for the selected first event 104A. The circuitry 202 may analyze the user profile information of each of the first set of users to determine whether each of the first set of users is suitable/eligible for participation for the selected first event 104A or not.

For example, in case the plurality of users 110 may be selected based on the location of corresponding subscribers, then the circuitry 202 may further analyze the education details of each of the first set of users for the selected first event 104A (for example 'Robo-Mania' event) to determine the filtered set of users (i.e. who may have robotics or related educational background, or interests). In such case, the first set of users with education background, interest, or hobbies in other domains (e.g. medical, journalism, teaching, brokers, accountants, law, or banking etc) may not be eligible or selected for the 'Robo-Mania' event, as the event may be relevant for students or people in robotic (or engineering) domain. Therefore, the circuitry 202 may filter the second set of users (or the second set of user devices) from the first set of users (or the first set of user devices 112) based on the user profile information retrieved from the memory 204 for the first set of users and the event data associated with the selected first event 104A. As another example, in an award function event of a corporate organization, the first set of users may be further filtered to the second set of users who may be current employees in the corporate organization or alumnus of the corporate organization.

At 310, a resource determination operation may be performed. In the resource determination operation, the circuitry 202 may be configured to determine a set of resources that may be required to host the selected first event 104A. The set of resources may include, but is not limited to, a physical space (like a building, a conference hall, meeting room, or parking slots), hardware devices (like computers, laptop, internet devices, security device, or electrical devices), software applications, power equipments (like battery backup, generators, charging stations, etc), stationary items, wearable items, seating equipment's, or eatable items. As described at step 302 of FIG. 3, the stored event data of the plurality of events 104 may indicate Information about the plurality of resources required to host the selected first event 104A. related to the selected first event 104A. In an embodiment, the plurality of resources may be based on the type or category of the plurality of events 104. For example, resources required to host an educational event may be different from a health-care event. The educational event by required resources such as furniture items, stationary items, or projector, power backup, or computing machine. However, the health-care event (such as blood donation event) may require different resources (such as beds, medicines, medical instrument, an ambulance service, or energy eatables items) to host the health-care event.

In an embodiment, the plurality of resources required to host the selected first event 104A (i.e. as indicated by the stored event data related to the selected first event 104A) may be based on a particular number of participants for the first event 104A. In some embodiments, the first set of users or the second set of users (i.e. for whom the responses received at step 308) may be equal to the particular number of participants indicated in the event data for the first event 104A. In such instance, the set of resources actually required to host the first event 104A may be same as the plurality of resources. In some other embodiments, the first set of users or the second set of users may be lesser than the particular number of participants. In such instance, the set of resources actually required to host the selected first event 104A may be lesser the plurality of resources. Thus, the set of resources may be determined based on a number of the first set of users or second set of users (i.e. from whom responses received at step 308), a number of the plurality of resources defined in the event data for the predefined number of participants. In some embodiments, the type of resources in the set of resources and the plurality of resources may remain same, however quantity of resources in the set of resources and the plurality of resources may be different.

In an example, the plurality of resources required for the 'Robo-Mania' event may be laptops, robotic components, electric charge generators, seating furniture, and food items, where for 100 participants (i.e. plurality of users 110), 100 laptops, 400 robotic components, 50 electric charge generators, 100 chairs, and 200 food items may be required. However, if number of users (or user devices) in the first set of users/second set of users (from who the responses may be received on the transmitted notification at step 306) is 50% of the plurality of users 110, then the circuitry 202 may determine the set of resources that may be 50% of the plurality of resources, for example 50 laptops, 200 robotic components, 25 electric charge generators, 50 chairs, and 100 food items. Therefore, the disclosed server 102 may dynamically determine the set of resources based on the number of first set of users/second set of users (or the corresponding number of user devices) which may be finally selected as participants for the selected first event 104A. The dynamic determination may ultimately lead to saving of the organizer's expenses that may be utilized in purchasing/renting the set of resources required to host the event. On the other hand, by the utilization of the optimal resources by the disclosed server 102, the reputation of the organizers or organization of the server 102 may be enhanced which may be further beneficial for complete society.

At 312, a resource request transmission operation may be performed. In resource request transmission operation, the circuitry 202 may be configured to generate a request to the plurality of end-devices 114 that may be associated with the plurality of associates 116. The request may be for procurement of the determined set of resources that may be required to host the selected first event 104A. The circuitry 202 may be configured to generate the request for each of the plurality of end-devices 114 based on the determined set of resources. The circuitry 202 may be further configured to transmit the request, generated based on the determined set of resources, to each of the plurality of end-devices 114. The procurement of the determined set of resources may correspond to purchase or rent of the determined set of resources from at least one of the plurality of associates 116 for the selected first event 104A. The plurality of associates 116 may include, but not limited to, a plurality of vendors, dealers, suppliers, or a service provider that may provide the set of resources required to host each of the plurality of events 104. The plurality of associates 116 may be situated within a feasible distance from the absolute geo-location of the selected first event 104A. The contact details of the plurality of associates 116 and the plurality of end-devices 114 may be stored in the event data stored in the memory 204. The transmitted request may include, but not limited to, first information related to number of the first set of users as participants, second information related to the set of resources required, or the event data for the selected first event 104A. The details about the transmitted request for the procurement of the set of resources are described, for example, in FIG. 5.

At 314, a confirmation reception operation may be performed. In the confirmation reception operation, the circuitry 202 may be configured to receive confirmation information from one or more end-devices of the plurality of end-devices 114 (i.e. to which the procurement request has been sent at step 312). The confirmation information may be received based on the transmitted request and may indicate a confirmation or rejection provided by the corresponding associate (like vendor) for the delivery of the resources at the absolute geo-location of the selected first event 104A indicated in the transmitted request. For example, in case the request is rejected by the first associate 116A, the circuitry 202 may be configured to update the request transmitted to the other associates of the plurality of associates 116, to further accommodate the resources that were supposed to be procured from the first associate 116A. In such case, the circuitry 202 may resend the request for the procurement to the set of resources to the plurality of end-devices 114 associated with the plurality of associates 116.

In another example, in case the received confirmation information may indicate an acceptance for delivery of the required resources mentioned in the transmitted request, the confirmation information received from the corresponding end-device of the associate may also include an invoice determined based on the required resources (i.e. indicated in the transmitted request). The invoice may include a total amount to be paid to the corresponding associate for the procurement of the resources to host the selected first event 104A. In FIG. 3, for example, there are shown the set of resources (such as a conference room in a building, an electric generator, a sofa set, a computer, and connection cables) regarding which information may be included in the request transmitted at step 312 or included in the confirmation information received from a particular associate (like vendor to which the request is transmitted at step 312).

At 316, a logistic information transmission operation may be performed. In the logistic information transmission operation, the circuitry 202 may be configured to generate and transmit logistic information (i.e. related to the selected first event 104A) to the first set of user devices 112 which may be related to the first set of users (for example participants accepted the notification transmitted at steps 306 and 308). In some embodiments, the logistic information may be transmitted to a second set of user devices that may be associated with the second set of users. In an embodiment, the circuitry 202 may transmit the logistic information based on the received confirmation information from one or more of the plurality of end-devices 114 associated with the plurality of associates 116 at step 314. The transmitted logistic information may include, but is not limited to, a geo-location of the selected first event 104A, navigation information of the selected first event 104A, date-time information of the selected first event 104A, invitation information of the selected first event 104A, or a first set of instructions for participants. In some embodiments, the transmitted logistic information may correspond to an invitation for each of first set of users or the second set of users for participation in the selected first event 104A. The details of the logistic information are described, for example, in FIGS. 6 and 7.

Therefore, the disclosed server 102 may automatically collaborate with multiple devices and entities, such as the plurality of partner devices 106, the plurality of user devices 108, and the plurality of end-devices 114 to effectively manage the plurality of events 104. With the execution of different operations (as described, for example, from steps 302 to 316), the disclosed server 102 may act as a unified platform for the organization, the partners, and the uses for the management of different events.

Figure 4:
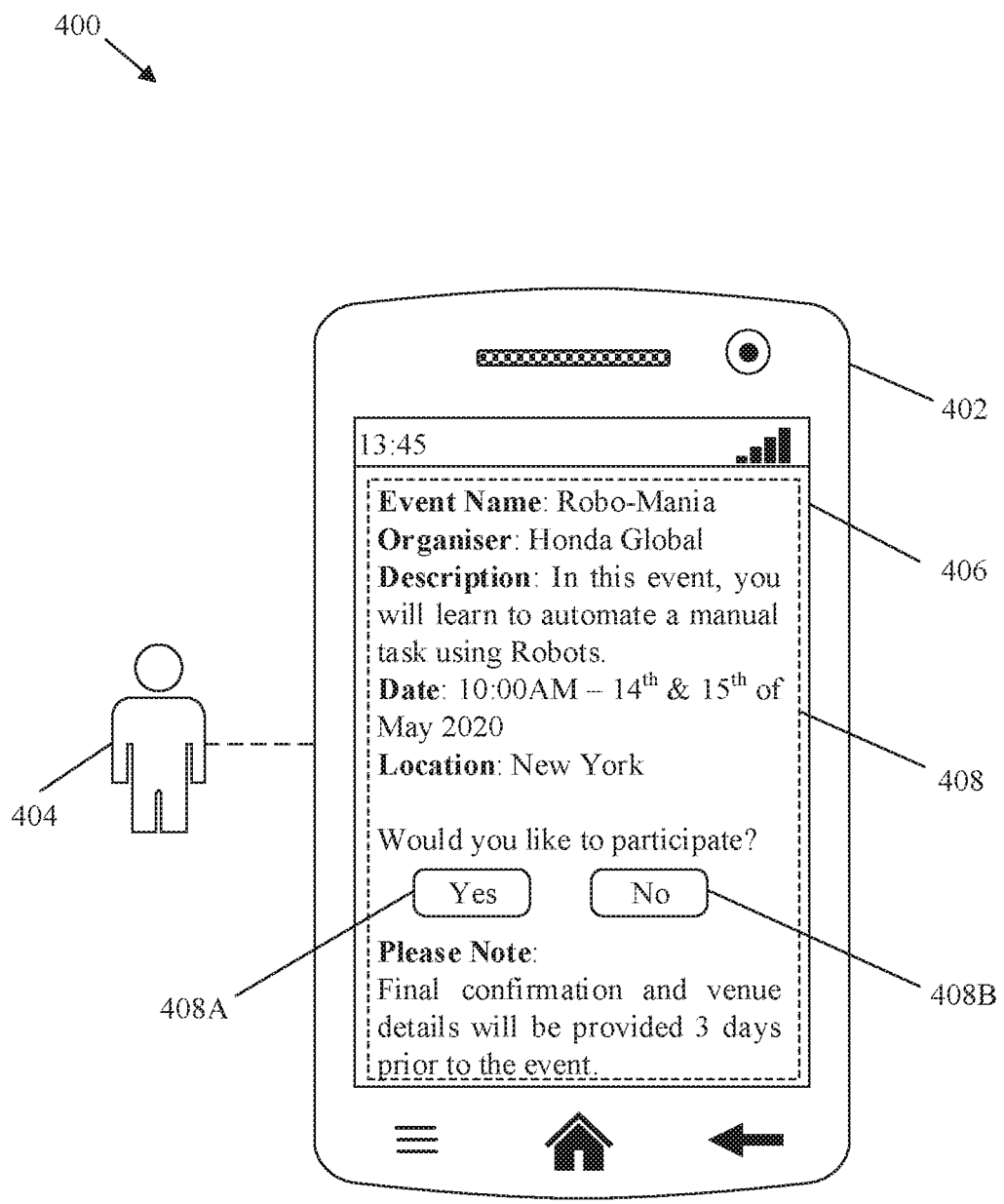
FIG. 4 is a diagram that illustrates an exemplary notification related to an event, transmitted on a user device associated with one of the plurality of users of FIG. 1, in accordance with an embodiment of the disclosure.

FIG. 4 is a diagram that illustrates an exemplary notification related to an event, transmitted on a user device associated with one of the plurality of users of FIG. 1, in accordance with an embodiment of the disclosure. FIG. 4 is explained in conjunction with elements from FIGS. 1, 2, and 3. With reference to FIG. 4, there is shown an exemplary scenario 400 in which there is shown a user device 402 that may be associated with a user 404. The user device 402 may include a display screen 406 that may be configured to render a notification 408 received from the server 102 or the circuitry 202.

The user device 402 may be one of the plurality of user devices 108 and the user 404 may be one of the determined plurality of users 110 (or one of the first set of users or the second set of users described in FIG. 3). The circuitry 202 may transmit the notification 408 to each of the plurality of user devices 108 that may also include the user device 402. The user device 402 may be configured to receive the transmitted notification 408 and may display the received notification 408 for the user 404, via the display screen 406. In an embodiment, the displayed notification 408 may be associated with the mobile application or the web application of the server 102 installed on the user device 402.

The received notification 408 may include the event data related to the selected first event 104A. The event data may include, but is not limited to, a geo-location of the selected first event 104A, a title (like "Event Name" of the selected first event 104A, a type of the selected first event 104A, date-time information of the selected first event 104A, or information about an organizer of the selected first event 104A as shown, as example, in the notification 408 in FIG. 4. For example, as shown in FIG. 4, the 'Robo-Mania' event may be scheduled to be hosted in 'New York' location on a particular date-time. Therefore, the transmitted notification 408 for the 'Robo-Mania' event may include, but is not limited to, the name of the event as "Robo-Mania", the organizers of the event as "Honda Global", a description about the event as "In this event, you will learn to automate a manual task using Robots", the date-time information of the event, the geo-location of the event as "New Your". The description about the event may provide a broad overview about the event. The geo-location of the event may correspond to the absolute location or the relative location.

The received notification 408 may inform the user 404 associated with the user device 402 about the selected first event 104A. The user device 402 may be configured to receive a response from the user 404 in response to the received notification 408. The response may indicate whether the user 404 may be interested and available to attend the selected first event 104A. As shown in FIG. 4, the received notification 408 may include a first (graphical user interface (GUI) button 408A and a second GUI button 408B that may be displayed on the display screen 406. The user device 402 may receive the response from the user 404 via the first GUI button 408A or the second GUI button 408B. For example, the response via the first GUI button 408A may indicate the acceptance of the user 404 to attend the selected first event 104A and the response via the second GUI button 408B may indicate the rejection of the user 404 to attend the selected first event 104A related to the received notification 408. The user device 402 may be further configured to transmit the response to the circuitry 202 of the server 102 as described, for example, at step 308 in FIG. 3.

It may be noted that the user device 402, the notification 408, the first GUI button 408A, and the second GUI button 408B shown in FIG. 4 are merely presented as an example, without any deviation from the scope of the disclosure. The user device 402 may be any electronic device with communication and display capability, to display the notification received from the server 102 in different forms and receive the response from the user 404, via different GUI options (like textbox, checkbox, etc) without any deviation from the scope of the disclosure. In an embodiment, the user device 402 may receive the notification 408 or may provide response to the server 102, via other various communication protocols such as, but is not limited to, emails, message, or short message service (SMS).

Figure 5:
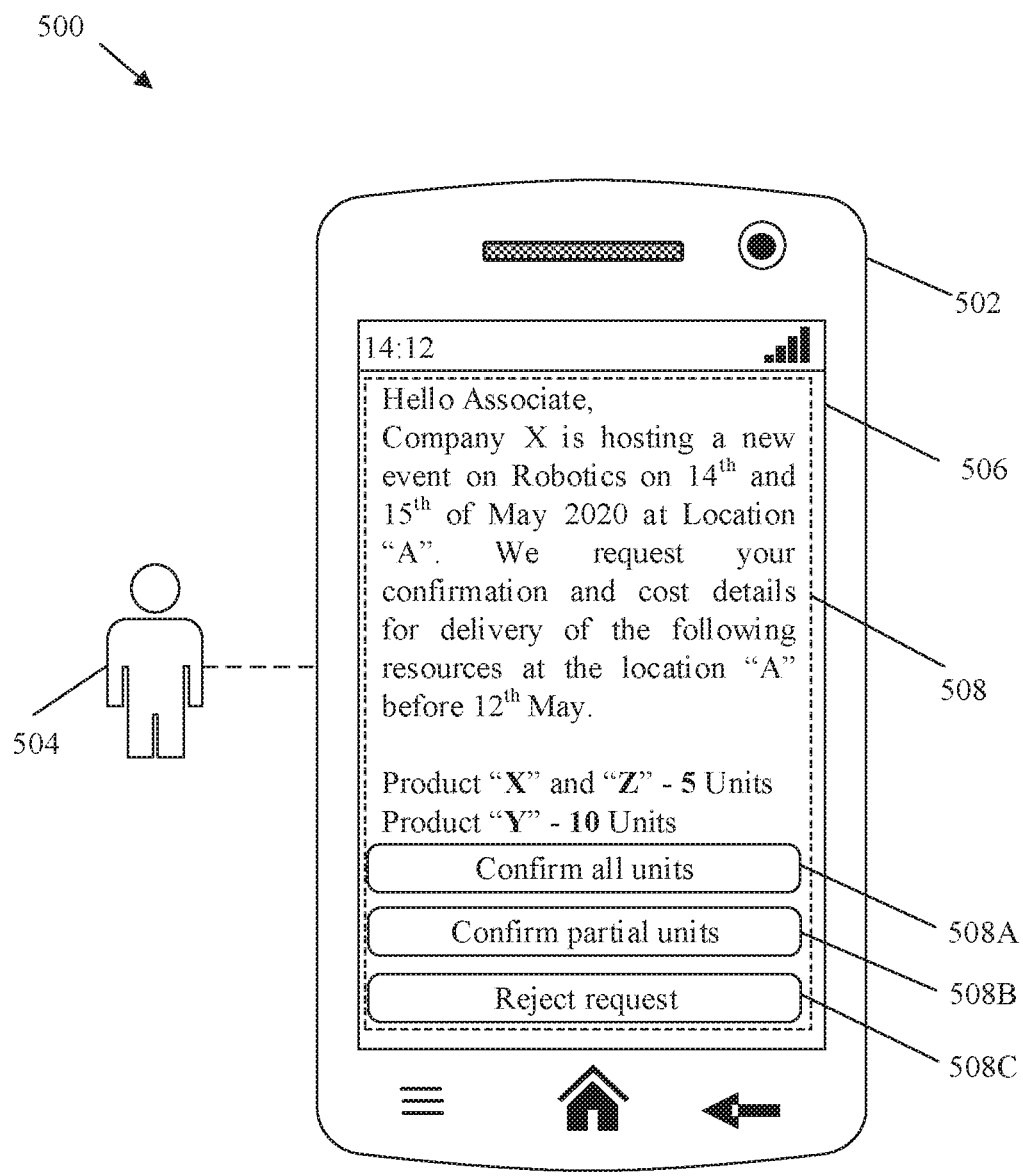
FIG. 5 is a diagram that illustrates an exemplary request transmitted to an end-device associated with one of the plurality of associates of FIG. 1, in accordance with an embodiment of the disclosure.

FIG. 5 is a diagram that illustrates an exemplary request transmitted to an end-device associated with one of the plurality of associates of FIG. 1, in accordance with an embodiment of the disclosure. FIG. 5 is explained in conjunction with elements from FIGS. 1, 2, 3, and 4. With reference to FIG. 5, there is shown an exemplary scenario 500 in which there is shown an end-device 502 associated with an associate 504. The end-device 502 may include a display screen 506 that may be configured to render a request 508 received from the server 102 or the circuitry 202 for procurement of the determined set of resources required to host the selected first event 104A as described, for example, at steps 310 and 312 in FIG. 3. For example, the end-device 502 may be one of the plurality of end-devices 114 and the associate 504 may be one of the plurality of associates 116 (like a vendor, a dealer, a supplier, or a service provider).

In an embodiment, the request 508 received from the server 102 may include, but not limited to, first information related to a number of participants for the selected first event 104A, second information related to the set of resources required to host the selected first event 104A, or the event data related to the selected first event 104A. The first information may indicate a total number of the users in the determined first set of users. The second information may indicate but is not limited to, a name of resource, and a number of resources that may be required from the associate 504 to host the selected first event 104A. In some embodiments, the second information may also include configuration information (like model number or information) related to set of resources required.

By way of example and not limitation, if the resource is a laptop, the configuration information may be "i9 processor clocked at 4.2 GHz, 64 GB RAM, 1 TB HDD, and SUPER Graphics Card". The event data related to the selected first event 104A may include, but is not limited to, the name of the selected first event 104A, the geo-location where the selected first event 104A is scheduled to be hosted, and the date-time information associated with the selected first event 104A. It may be noted that the geo-location where the selected first event 104A is scheduled to be hosted, may be the absolute location (i.e. exact address of venue) rather than the relative location (i.e. city or street). For example, as shown in FIG. 5, complete information or a portion of the request 508 may be displayed on the display screen 506 of the end-device 502 of the associate 504. As shown in FIG. 5 the request 508 may include a description of the event (for example "Company X is hosting a new event on Robotics . . . at Location 'A'). The description may include details (such as organizer, name, date-time, and venue) of the selected first event 104A. Further, the displayed request 508 may include a request (i.e. "We request your confirmation and cost details for delivery of the following resources at the location 'A' before 12$^{th}$ May") to provide the set of resources to host the selected first event 104A. The displayed request 508 may also include required inputs related to the cost, which has to be provided by the associate 504, via the end-device 502 to the server 102. As shown in FIG. 5, the displayed request 508 includes details (such as name and number, i.e. "Product X—5 Units, Product Y—10 Units") of the set of resources required from the associate 504. In an example, one of the set of resources may be related to a booking of a building, a meeting room, a conference hall, a theatre, a stadium, a party hall, or a ground, based on the type of the selected first event 104A.

In an embodiment, the display screen 506 of the end-device 502 may display a plurality of GUI elements 508A-508C based on the display of the response received from the server 102. As shown in FIG. 5, the plurality of GUI elements 508A-508C may be displayed in same display portion in which the request 508 may be displayed or may be displayed in different display portion, without any deviation from the scope of the disclosure. The plurality of GUI elements 508A-508C may include a first GUI button 508A, and a second GUI button 508B, and a third GUI button 508C. In an embodiment, the end-device 502 may utilize the plurality of GUI elements 508A-508C to provide the confirmation information to the server 102 (i.e. descripted at step 314 of FIG. 3) for the set of resources indicated in the request 508. The end-device 502 may be configured to receive an input from the associate 504, via the first GUI button 508A. The input received via the first GUI button 508A may indicate that the associate 504 may provide all the set of resources (such as 5 Units of Product "X" and "Z" and 10 Units of Product "Y") for the selected first event 104A. In such case the end-device 502 may transmit the confirmation information (i.e. indicating an acceptance to deliver all the resources mentioned in the request 508) to the server 102.

In another example, the end-device 502 may be configured to receive an input from the associate 504, via the second GUI button 508B. The input received via the second GUI button 508B may indicate that the associate 504 may not be able to provide all the set of resources, but may provide partial number of resources which may be a subset of number of the set of resources mentioned in the request 508 received from the server 102. The end-device 502 may receive another input from the associate 504, indicating the exact number of resources which may be provided by the associate 504. The end-device 502 may receive exact number of resources available, via a GUI textbox (not shown) from the associate 504. For example, the exact available resource may be 3 Unit of Product "X", 6 Units of Product "Y", and 2 Units of Product "Z") for the selected first event 104A. In such case, the end-device 502 may transmit the confirmation information (i.e. indicating the availability of the partial number resources to host the event) to the server 102. In an embodiment, one end-device (of the plurality of end-devices 114) of an associate (of the plurality of associates 116) may receive the request 508 from the server 102, to provide the required set of resources (such as certain products) to a particular venue (for example a booked conference hall as a resource for the selected first event 104A) which may be owned by another associate of the plurality of associates 116.

Similarly, in case, the set of resources included in the request 508 received from the server are not available, the end-device 502 may receive an input from the associate 504, via the third GUI button 508C, where the input or selection of the third GUI button 508C may indicate a rejection of the request 508. The rejection may indicate that the set of resources may not be available at an end of the associate 504 to host the selected first event 104A. In such case, the confirmation information transmitted from the end-device 502 to the server 102 may indicate rejection or denial of the associate 504 to provide the set of resources either completely or partially. In an embodiment, the confirmation information may also include the cost details to provide the set of resources to host the first event 104A.

It may be noted that the end-device 502, the displayed request 508, the first GUI button 508A, the second GUI button 508B, and the third GUI button 508C as shown in FIG. 5 are merely presented as an example, without any deviation from the scope of the disclosure. The end-device 502 may be any electronic device which may display the request 508 in different forms for the associate 504, and receive the confirmation information from the associate 504 through different GUI ways, without any deviation from the scope of the disclosure. The description for different types of end-device 502, different display variations of the request 508 and ways to receive the confirmation information are omitted for the sake of brevity.

In accordance with an embodiment, the circuitry 202 of the server 102 may be configured to receive the confirmation information from the end-device 502 or one or more of the plurality of end-devices 114 based on the transmitted request 508. The circuitry 202 may be further configured to wait for the reception of the confirmation information for a predefined time interval (for example few hours or days based on the date-time of the event to be hosted). The circuitry 202 of the server 102 may be configured to transmit a reminder to the one or more of the plurality of end-devices 114 to receive the confirmation information.

In case, the confirmation information is not received from the end-device 502 of the associate 504 or the confirmation information indicating rejection of the request 508, the circuitry 202 of the server 102 may distribute the set of resources that were supposed to be procured from the associate 504) among other associates in the plurality of associates 116, based on the confirmation information (i.e. indicating availability of resources) received from the other associates. Similarly, in case that the confirmation information received from the end-device 502 of the associate 504 indicates that partial set of resources can be procured from the associate 504, the circuitry 202 may be configured to distribute the remaining resources that were supposed to be procured from the associate 504, among other associates of the plurality of associates 116.

In some embodiments, all the determined set of resources may be procured from only one associate. In some other embodiments, the determined set of resources may be procured from the plurality of associates 116. In such instance, the name and number of resources may vary in each request transmitted to each of the plurality of associates 116. Each of the plurality of end-devices 114 may further transmit the confirmation information to the server 102. The circuitry 202 of the server 102 may be further configured to transmit a response to the end-device 502 (or others of the plurality of end-devices 114) based on the received confirmation information. The transmitted response may be an acknowledgement to the confirmation information and may further include acceptance of the cost details include in the confirmation information. The acceptance of the cost details may be based on a predefined cost threshold set in the memory 204 for different types of resources, event or associates.

Figure 6:
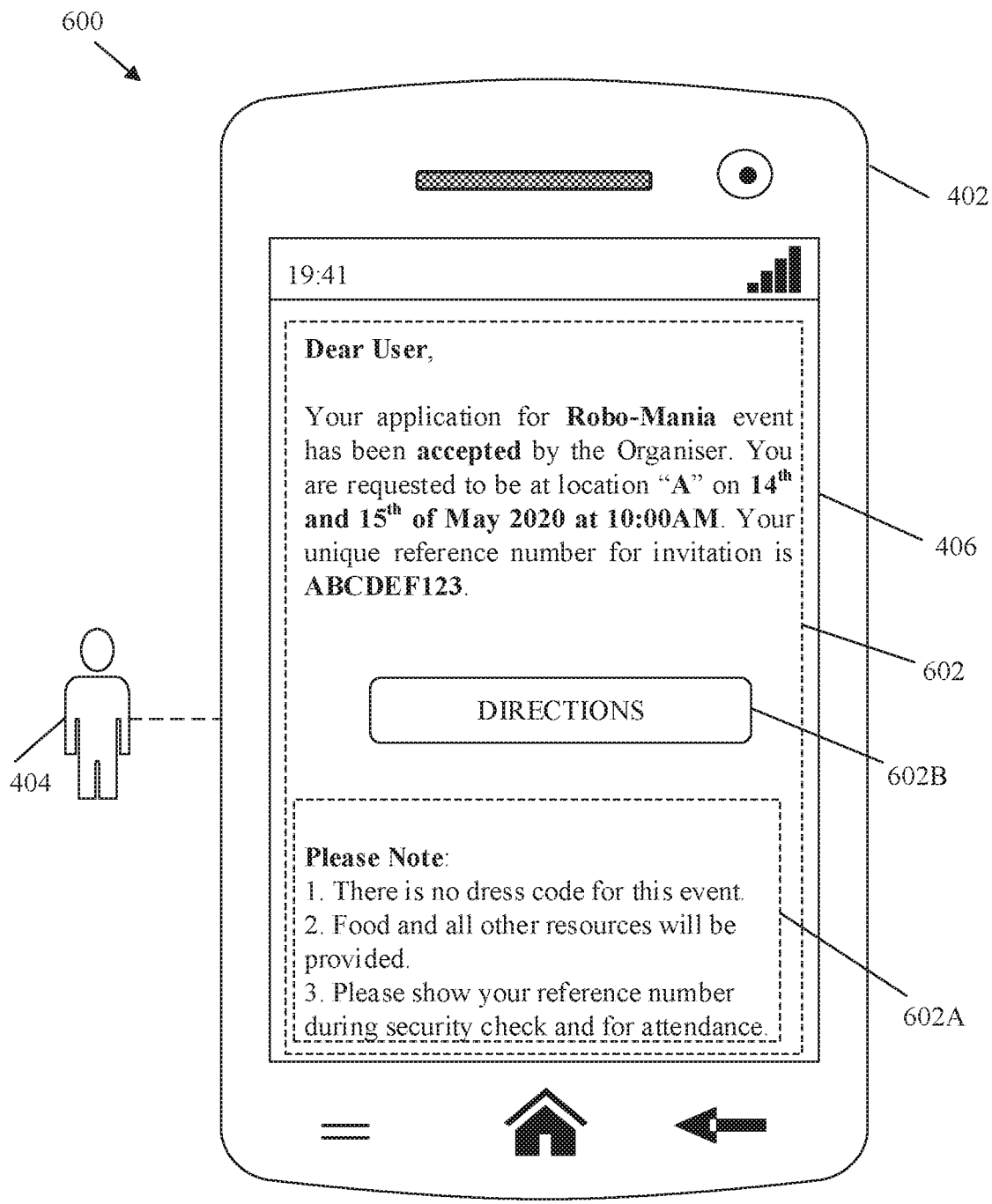
FIG. 6 is a diagram that illustrates an exemplary logistic information transmitted to a user device associated with one of the plurality of users of FIG. 1, in accordance with an embodiment of the disclosure.

FIG. 6 is a diagram that illustrates an exemplary logistic information transmitted to a user device associated with one of the plurality of users of FIG. 1, in accordance with an embodiment of the disclosure. FIG. 6 is explained in conjunction with elements from FIGS. 1, 2, 3, 4, and 5. With reference to FIG. 6, there is shown an exemplary scenario 600 in which there is shown the user device 402 of FIG. 4. The user device 402 may be associated with the user 404. The user device 402 may include the display screen 406 that may be further configured to render logistic information 602 that may be received from the server 102 or the circuitry 202, as described, for example, at step 316 in FIG. 3.

Based on the received confirmation information, the circuitry 202 may be configured to transmit the logistic information 602 to each of the first set of user devices 112 associated with the first set of users, who may be the selected participants for the selected first event 104A. In another embodiment, the logistic information 602 may be transmitted to each of the second set of user devices associated with the second set of users. The logistic information 602 may correspond to a digital formal invitation sent to each of the first set of user devices 112 or the second set of user devices. The logistic information 602 may include, but is not limited to, name of the selected first event 104A, a geo-location of the selected first event 104A, navigation information of the selected first event 104A, date-time information of the selected first event 104A, invitation information of the selected first event 104A, or a first set of instructions 602A.

As shown in FIG. 6, the displayed logistic information 602 may indicate the name (i.e. Robo-Mania") of the first event 104A for which the participation for the user 404 has been accepted. The geo-location in the logistic information 602 may correspond to the absolute location (i.e. location "A" in FIG. 6) where the selected first event 104A is scheduled to be hosted. The navigation information may include navigational instructions to reach the geo-location of the selected first event 104A. The displayed logistic information 602 by include a direction button 602B that may be selected by the user 404 to receive the navigational instructions which is described, for example, in FIG. 4. Further, the date-time information (i.e. "14$^{th}$ and 15$^{th}$ of May 2020 at 10:00 AM" in FIG. 6) in the logistic information 602 may correspond to the actual date and time when the selected first event 104A is scheduled to be hosted. The invitation information in the logistic information 602 may include a unique reference number ("ABCDEF123" in FIG. 3) for the user 404 that may distinguish the user 404 from other users of the first set of users or the second set of users. During the selected first event 104A, the user 404 may utilize the unique reference number to get entry or attendance in the first event 104A. In some embodiments, the invitation information may be in an alpha-numeric format, or an encoded format such as quick response (QR) code. The first set of instructions 602A may include information/guidelines that may followed by the participant (such as the user 404) before or during the selected first event 104A. For example, the first set of instructions 602 may include, but is not limited to, information about dress code, resources that participants are required to bring with them, eatable arrangements on the event, security arrangements, permissions granted by authorities, safety arrangements, or Do's and Don'ts for the participants of the event.

In an embodiment, the circuitry 202 of the server 102 may be configured to generate the first set of instructions 602A for the selected first event 104A based on the event data related to the selected first event 104A. For example, for the type of event as Sports, the first set of instructions 602A (like dress code) may be different. In another example, for a health-care event, the first set of instructions 602A (like eatable arrangements) may be different. In some embodiments, the server 102 may include a machine learning model (not shown) that may analyze the event data of a particular event, and accordingly generate the first set of instructions 602A that may be transmitted in the logistic information to the first set of user devices 112 of the first set of users or the second set of users. The machine learning model may be trained based on relationships between variations in the event data and the variations in the first set of instructions 602A. Hence, the disclosed server 102 may be intelligent enough to generate the first set of instructions 602A dynamically without any user-intervention, based on the event data for the selected first event 104A.

Figure 7:
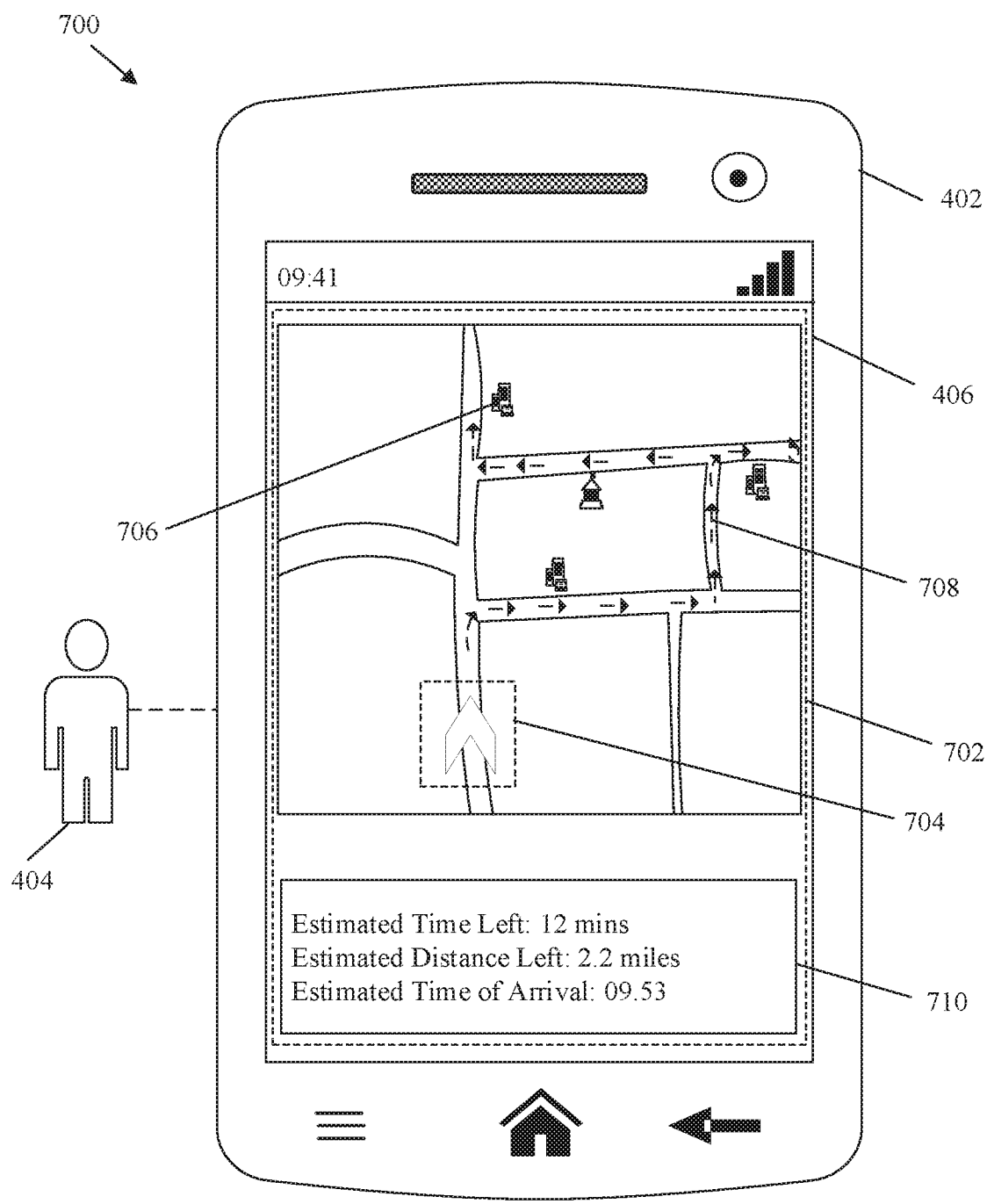
FIG. 7 is a diagram that illustrates exemplary navigational instructions transmitted to a user device associated with one of the plurality of users of FIG. 1, in accordance with an embodiment of the disclosure.

FIG. 7 is a diagram that illustrates exemplary navigational instructions transmitted to a user device associated with one of the plurality of users of FIG. 1, in accordance with an embodiment of the disclosure. FIG. 7 is explained in conjunction with elements from FIGS. 1, 2, 3, 4, 5, and 6. With reference to FIG. 7, there is shown an exemplary scenario 700 in which there is shown the user device 402. The user device 402 may be associated with the user 404 and may include the display screen 406 that may be configured to render navigational instructions 702 which may be received from the server 102 or the circuitry 202. The navigational instructions 702 may be displayed on the display screen 406 based on the selection of the direction button 602B as described, for example, in FIG. 6. In an embodiment, the circuitry 202 of the server 102 may be configured to transmit the navigational instructions 702 to the user device 402. The navigational instructions 702 may provide map or route related guidance or instructions to the user 404 to reach the absolute location of the selected first event 104A on the exact day of the event.

In an embodiment, for example, on the day of the selected first event 104A, the user device 402 may receive an input (or determine the selection), via the direction button 602B (in FIG. 6) from the user 404, to get the navigational instructions 702 to reach the location of the selected first event 104A. The circuitry 202 or the user 404 may be further configured to determine a current geo-location 704 of the user device 402, for example using a global position system (GPS) integrated in the user device 402. In some embodiments, the circuitry 202 may transmit instructions to the user device 402 to fetch the current geo-location 704 of the user device 402. In such case, the user device 402 may determine the current geo-location 704, and transmit the determined current geo-location 704 to the circuitry 202 based on the transmitted instructions. The circuitry 202 may be further determine a geo-location 706 (i.e. absolute location) of the selected first event 104A from the stored event data. The circuitry 202 may further generate navigational instructions 702 (i.e. route) to reach the geo-location 706 of the selected first event 104A from the current geo-location 704 of the user device 402. The circuitry 202 may further transmit the generated navigational instructions 702 to the user device 402 to be further displayed on the display screen 406 in FIG. 7.

The navigational instructions 702 may correspond a route 708 that the user 404 may follow to reach the geo-location 706 of the selected first event 104A. The route 708 may be displayed on a map that may be rendered on the display screen 406 as shown in FIG. 7. The navigational instructions 702 may also include navigational data 710 that may be displayed on the display screen 406 during the travel to the geo-location of the selected first event 104A. The navigational data 710 may include, but not limited to, an estimated time left to reach the geo-location 706, an estimated distance left to reach the geo-location 706, and an estimated time of arrival at the geo-location 706. By way of an example, as shown in FIG. 7, the navigational data 710 may include the estimated time left to reach the geo-location 706 as "12 mins", the estimated distance left to reach the geo-location 706 as "2.2 miles", and the estimated time of arrival at the geo-location 706 as "09:53". Thus, the server 102 may be configured to determine the respective geo-locations of each of the first set of user devices 112 of the first set of users (i.e. participants of the event) and generate respective navigational instructions (i.e. such as navigational instructions 702) for each of the first set of user devices 112 to reach the geo-location of the selected first event 104A. The circuitry 202 of the server 102 may be further configured to transmit the generated navigational instructions 702 to each of the first set of user devices 112.

In some embodiments, the user device 402 may be configured to generate the navigational instructions 702 and/or the navigational data 710 based on the current geo-location 704 and the geo-location 706 of the selected first event 104A. The user device 402 may be configured to receive the geo-location 706 of the selected first event 104A in the logistic information 602 from the server 102. Other than the navigational instructions 702 shown in FIG. 7, the circuitry 202 of the server 102 or the user device 402 may be configured to generate the navigational instructions 702 for indoor navigation once the user device 402 or the user 404 reaches the geo-location 706 of the selected first event 104A. For example, in case the selected first event 104A is hosted in a building, then navigational instructions 702 may be provided inside the building to reach the exact location (i.e. room, conference hall, floor) of the selected first event 104A. For example, the geo-location 706 may be "Meeting Room-X on Floor-Y in Building-A". In such a scenario, the circuitry 202 or the user device 402 may determine the exact location of the user device 402 404 inside the Building-A. The circuitry 202 or the user device 402 may be configured to store building or floor map data of corresponding venues of the plurality of events 104. The circuitry 202 or the user device 402 may be further configured to determine the exact location (i.e. particular room, floor, etc.) of the user device 402 inside the building (or venue) based on the stored building or floor map data and indoor positioning signals (such as Wi-Fi, beacons, or radio frequency identification). The circuitry 202 or the user device 402 may be further configured to generate the navigational instructions 702 inside the building to assist the user 404 to easily reach the venue to the selected first event 104A. For example, the navigational instructions 702 may include "Take first left from gate to reach at the entrance of Tower-Y, take elevators to reach to the Floor-Y, and then take the third right to reach the meeting room-X". In some embodiments, the navigational instructions 702 may also help the user 404 to reach at a specific booth in the selected first event 104A or to a location where the first set of users or the second set of users or friends of the user 404 have already assembled. In some embodiment, the server 102 may transmit instructions or commands to a control device of the venue, where the control device may control guiding or alerting lights/speakers in the venue (i.e. building) to assist the first set of users to easily reach the exact location of the selected first event 104A. Hence, the disclosed server 102 may automatically assist each participant to reach to the intended destination. In some embodiments, the circuitry 202 of the server 102 may provide instructions to the user device 402, to further assist the user to get an available parking slot inside the venue of the event, reach nearby famous tourist attraction, or reach different health facilities (like hospitals, police stations) close to the venue of the event (i.e. selected first event 104A).

Figure 8:
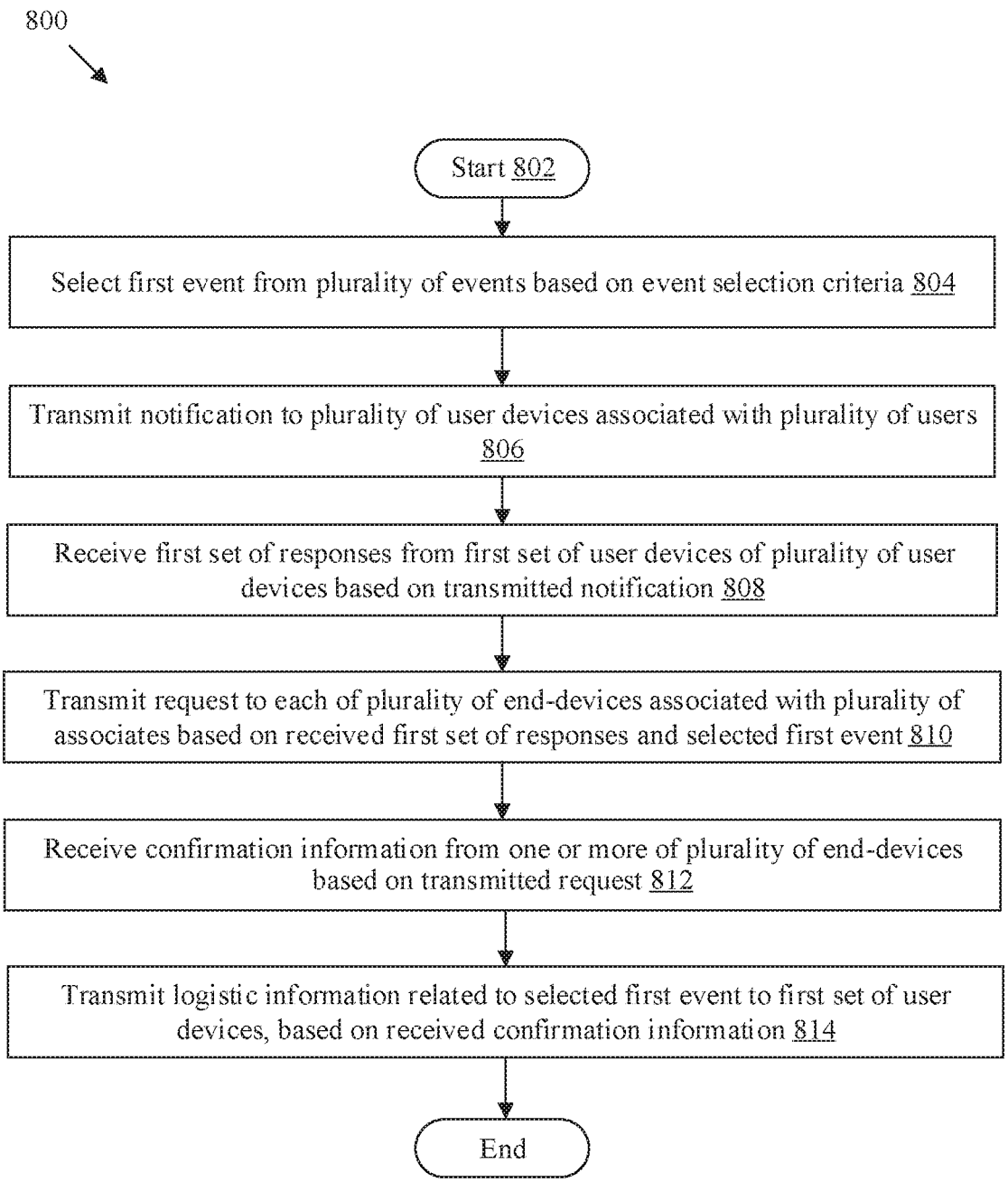
FIG. 8 is a flowchart that illustrates exemplary operations for management of event, in accordance with an embodiment of the disclosure.

FIG. 8 is a flowchart that illustrates exemplary operations for management of event, in accordance with an embodiment of the disclosure. With reference to FIG. 8, there is shown a flowchart 800. The flowchart 800 is described in conjunction with FIGS. 1, 2, 3, 4, 5, 6, and 7. The operations from 802 to 814 may be implemented, for example, by the server 102, or the circuitry 202 of FIG. 2. The operations of the flowchart 800 may start at 802 and proceed to 804.

At 804, the first event 104A from the plurality of events 104 may be selected. The first event 104A may be indicated in the stored event data and may be selected based on the event selection criteria. In accordance with an embodiment, the server 102 or the circuitry 202 may be configured to select the first event 104A from the plurality of events 104 (indicated in the stored event data) based on the event selection as described, for example, in FIG. 3 (step 302).

At 806, the notification 408 may be transmitted to the plurality of user devices 108 associated with the plurality of users 110. The transmitted notification may include the event data related to the selected first event 104A. In accordance to an embodiment, the server 102 or the circuitry 202 may be configured to transmit the notification 408 to the plurality of user devices 108 associated with the plurality of users 110, wherein the transmitted notification may include the event data related to the selected first event 104A as described, for example, in FIGS. 3 (step 306) and 4.

At 808, the first set of responses may be received. The first set of responses may be received from the first set of user devices 112 of the plurality of user devices 108 based on the transmitted notification 408. In accordance to an embodiment, the server 102 or the circuitry 202 may be configured to receive the first set of responses from the first set of user devices 112 of the plurality of user devices 108 based on the transmitted notification 408 as described, for example, in FIGS. 3 (step 308) and 4.

At 810, the request 508 may be transmitted to each of the plurality of end-devices 114 associated with the plurality of associates 116. The request 508 may be transmitted based on the received first set of responses and the selected first event 104A. The request 508 may be for the procurement of the set of resources required to host the selected first event 104A. In accordance to an embodiment, the server 102 or the circuitry 202 may be configured to transmit the request 508 to each of the plurality of end-devices 114 associated with the plurality of associates 116 based on the received first set of responses (at step 808) and the selected first event 104A as described, for example, in FIGS. 3 (step 312) and 5.

At 812, the confirmation information may be received from one or more of the plurality of end-devices 114 based on the transmitted request. In accordance to an embodiment, the server 102 or the circuitry 202 may be configured to receive the confirmation information from one or more of the plurality of end-devices 114 based on the transmitted request as described, for example, in FIGS. 3 (step 314) and 5.

At 814, the logistic information 602 related to the selected first event 104A may be transmitted to the first set of user devices 112. The logistic information 602 may be transmitted based on the received confirmation information. In accordance to an embodiment, the server 102 or the circuitry 202 may be configured to transmit the logistic information 602 related to the selected first event 104A to the first set of user devices 112, based on the received confirmation information as described, for example, in FIGS. 3 (step 316), 6, and 7. Control may pass to end.

Figure 9:
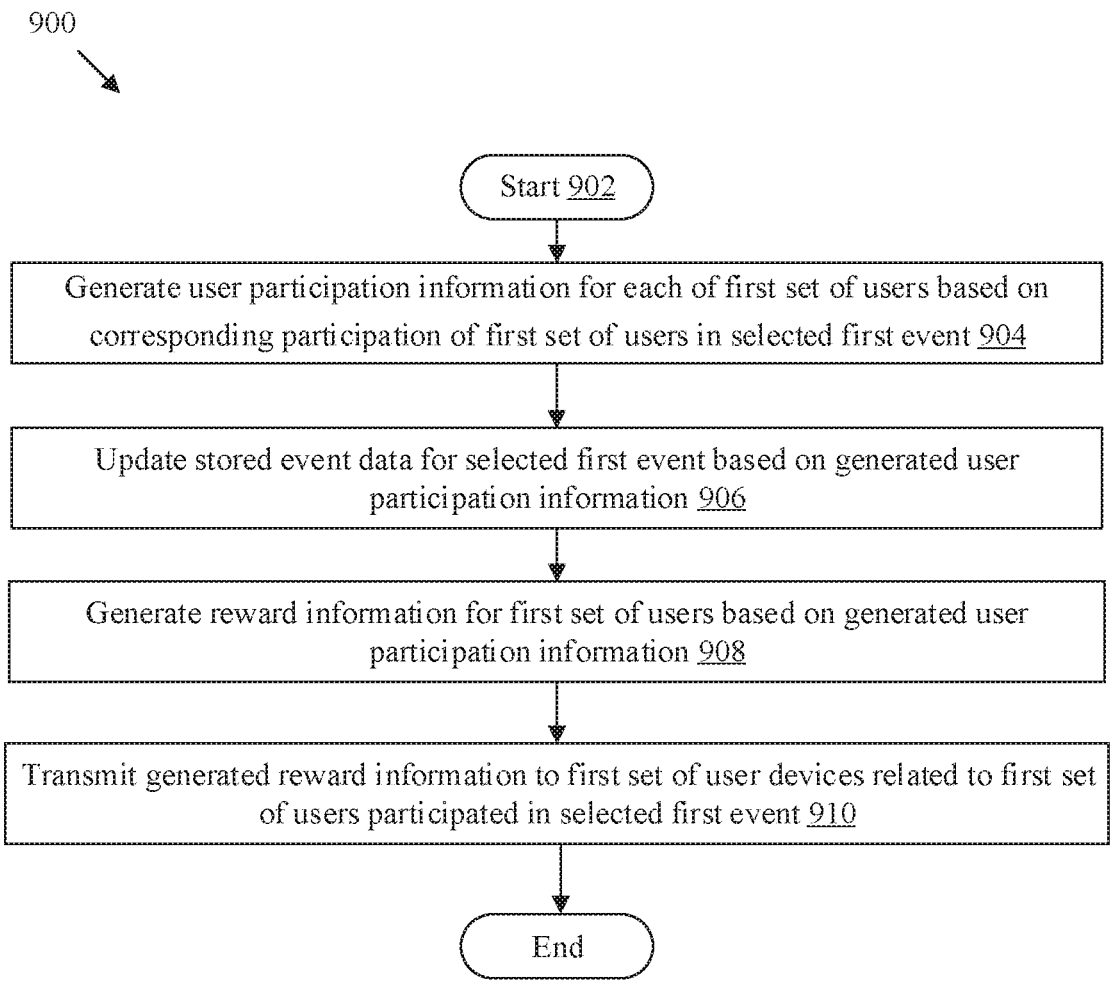
FIG. 9 is a flowchart that illustrates exemplary operations for generation of user participation information and reward information, in accordance with an embodiment of the disclosure.

FIG. 9 is a flowchart that illustrates exemplary operations for generation of user participation information and reward information, in accordance with an embodiment of the disclosure. With reference to FIG. 9, there is shown a flowchart 900. The flowchart 900 is described in conjunction with FIGS. 1, 2, 3, 4, 5, 6, 7, and 8. The operations from 902 to 910 may be implemented, for example, by the server 102, or the circuitry 202 of FIG. 2. It may be noted that some of the operations of the flowchart 900 may be performed during the on-going of the selected first event 104A and the rest of the operations of the flowchart 900 may be performed after the completion of the selected first event 104A. In an embodiment, all the operations 902 to 910 may be performed after the completion of the selected first event 104A, without any deviation from the scope of the disclosure. The operations of the flowchart 900 may start at 902 and proceed to 904.

At 904, user participation information for each of the plurality of the first set of users may be generated. In an embodiment, the circuitry 202 of the server 102 may be configured to generate the user participation information based on the participation of the corresponding user in the selected first event 104A. The user participation information for the first set of users (or the second set of users) may include, but is not limited to, information about acceptance of the selected first event 104A, information about time spent at the selected first event 104A, purchasing information during the selected first event 104A, or interaction information at the selected first event 104A.

The information about the acceptance of the selected first event 104A may be based on the acceptance response received from the user device 402 (associated with the user 404) at step 308 i FIG. 3. If the user 404 accepts or rejects the notification 408 about the selected first event 104A (received at step 306), the corresponding information about the acceptance may be stored in the user participation information associated with the user 404.

The circuitry 202 may also track a time spent by the user 404 at the selected first event 104A. As an example, the venue of the selected first event 104A may have a plurality of sensors such as image capture devices (i.e. camera) that may track the user 404 at the venue. In some embodiments, the circuitry 202 may determine entry-exit timing information corresponding to the user 404 based on the unique identifier associated with the user device 402 or the invitation information that may be included in the logistic information 602. In some embodiments, the resources required to host the selected first event 104A may include sensors that may record every movement of the user 404 or the user device 402 in the venue of the selected first event 104A. The time spent by the user 404 at the selected first event 104A may be included in the user participation information.

The purchasing information may include information about the products or services purchased by the user 404 during the selected first event 104A. The purchasing information may include cost spent by the user 404 to purchase the products or services during the selected first event 104A. In an embodiment, the circuitry 202 of the server 102 may receive the purchasing information from an electronic device (such as a vending machine, or a billing device) located at the first event 104A, and further stored in the user participation information. The interaction information may include information about the interaction of the user 404 with the plurality of organizers at the selected first event 104A. In some embodiments, a group of people like, but not limited to, scientists, brand ambassadors, celebrities, domain experts, or engineers may be present in the selected first event 104A. The interaction of the user 404 with such group of people may be recorded and stored as the user participation information corresponding to the user 404. The interaction information may include discussion or questions about, but not limited to, ideas, thoughts, positive comments, updates, innovations about new or existing products in the portfolio of products manufactured by the organizer or the organization associated with the server 102. For example, for the 'Robo-Mania' event, the group of people may be people who have experience in the field of Robotics. The interaction information of the user 404 may include ideas or innovations of using robots in the automation of several tasks. In accordance with an embodiment, the server 102 or the circuitry 202 may be configured to generate or receive the user participation information for each of the first set of users based on the corresponding participation of the first set of users in the selected first event 104A.

At 906, the stored event data for the selected first event 104A may be updated. The circuitry 202 of the server 102 may be configured to update the stored event data based on the generated user participation information. The updated event data may correspond to a potential set of customers or participants who may purchase a product of the organization or the plurality of partners 120 associated with the server 102 in future. The updated event data may also correspond to scouting potential talents who may work for the organization or the plurality of partners 120 associated with the server 102 in future. In an embodiment, the updated event data may also be referred as the historical information associated with the first event 104A during selection of a new event from the plurality of events 104. In some embodiments, the circuitry 202 may refer to the stored user participation information to determine the plurality of users 110 (or potential customers or subscribers) to be the participants in a future event. By way of example and not limitation, if the user participation information indicates that the user 404 has purchased multiple products or have a long interaction with any of the group of people or have spent time above a time threshold at the selected first event 104A, the corresponding user 404 may be selected and invited for participation in the future events. For example, based on the purchasing information, the server 102 may determine that the user 404 may be a potential participant to increase the revenue and sales of the products or services included in the future events. The group of people may also rate the interaction information with each of the first set of users. For example, if the user 404 provides potential ideas about updates on a project or a new invention, a rating for the user 404 may be high. If the user 404 further provides interesting and innovating ideas in most of the plurality of events 104, the server 102 may consider the user 404 as a potential employee for the organization or for the plurality of partners 120 associated with the server 102.

Therefore, the disclosed server 102 may store or update information about the potential future customers or participants for the products or services provided by the organization or partners of the selected first event 104A. The disclosed server 102 may allow acquisition and retention of such potential participants (i.e. the plurality of users 110) into an ecosystem of the organization or partners associated with the server 102. The disclosed server 102 may further allow to calculate or provide information about future sales of products/services offered by the organization or partners associated with the server 102.

At 908, reward information for the first set of users may be generated. The circuitry 202 of the server 102 may be configured to generate the reward information for the first set of users based on the generated user participation information. The reward information may include information of rewards that may be provided to the user 404, for example, via the user device 402. The rewards may be in the form of, but is not limited to, cashbacks, vouchers, gift cards, tickets, or awards. The circuitry 202 may analyze the user participation information after the completion of each of the plurality of events 104 and generate the reward information based on analysis of the user participation information.

By way of example and not limitation, if the purchasing information included in the user participation information indicates that the user 404 has purchased 5 products during the selected first event 104A, the reward information for the user 404 may include 500 digital coins that may be redeemed while purchasing products in future events. The reward information may be provided to further motivate the potential participants to actively participate in future events organized by the organization or partners associated with the server 102. In some embodiments, the reward information may be included in the stored user profile of each of the plurality of users 110. In some embodiments, the provided rewards may be a way to retain the participant in the ecosystem of the organizers or the plurality of partners 120, or acquire new potential participants who may unknown to the server 102. In some embodiments, the server 102 may generate information to improve existing/future products or services provided by the organization of the server 102 (or by the plurality of partners 120 associated with the server 102) based on the user participation information generated for the selected first event 104A or other of the plurality of events 104.

At 910, the generated reward information may be transmitted to the first set of user devices 112 related to the first set of users participated in selected first event 104A. In accordance to an embodiment, the server 102 or the circuitry 202 may be configured to transmit the generated reward information to the first set of user devices 112 related to the first set of users participated in selected first event 104A.

Therefore, the disclosed server 102 may act as a unified digital platform that may automatically perform a plurality of operations before hosting the event (such as, but not limited to, selection of event, transmission of notifications, resources determination, coordination with associates, or transmission of logistic information as described, for example, in FIGS. 3, 4, 5, 6 and 7), operations during the event (such as tracking user activities and generation of user participation information), and operations after the completion of the event (such as transmission of the reward information) for effective event management and acquisition/retention of potential customers.

Various embodiments of the disclosure may provide a non-transitory, computer-readable medium and/or storage medium, and/or a non-transitory machine readable medium and/or storage medium stored thereon, a set of instructions executable by a machine and/or a computer for event management. The set of instructions may be executable by the machine and/or the computer (for example the server 102) to perform operations that may include selecting a first event from a plurality of events based on an event selection criteria. The operations may further include transmitting a notification to a plurality of user devices. The transmitted notification may include event data related to the selected first event. The operations may further include receiving a first set of responses from a first set of user devices of the plurality of user devices based on the transmitted notification. The operations may further include transmitting a request to each of a plurality of end-devices based on the received first set of responses and the selected first event. The request may be for procurement of a set of resources required to host the selected first event. The operations may further include receiving confirmation information from one or more of the plurality of end-devices based on the transmitted request. The operations may further include transmitting logistic information related to the selected first event to the first set of user devices based on the received confirmation information.

Various embodiments of the disclosure may provide a user device (such as the user device 402 in FIGS. 4, 6 and 7). The user device may include circuitry (not shown) which may receive, from a server (such as the server 102), a notification which comprises event data which is related to a first event from a plurality of events, as described, for example, in FIGS. 3 and 4. The server may select the first event from the plurality of events based on an event selection criteria, as described, for example, in FIG. 3. The circuitry of the user device may further transmit, to the server, a response to participate in the selected first event based on the received notification, as described, for example, in FIG. 3. The circuitry of the user device may further receive, from the server, logistic information related to the selected first event, based on the transmitted response, as described, for example, in FIGS. 3, 6 and 7. The circuitry of the user device may further transmit, to the server, user profile information associated with the user device (or a user associated with the user device) to the server. The circuitry of the user device may further receive, from the server, the notification about the selected first event based on the transmitted user profile information, as described, for example, in FIGS. 3 and 4. The circuitry of the user device may further determine a geo-location of the user device and a geo-location of the selected first event and further generate navigational instructions to reach the geo-location of the selected first event based on the determined geo-location of the user device. The circuitry of the user device may further display the generated navigational instructions to reach the geo-location of the selected first event, as described, for example, in FIGS. 6 and 7. The circuitry of the user device may further receive, from the server, reward information which is generated based on participation of the user device in the selected first event, as described, for example, in FIG. 9.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. A server, comprising:
a memory that stores event data related to a plurality of events; and
circuitry coupled to the memory, wherein the circuitry:
selects a first event from the plurality of events indicated in the stored event data, based on an event selection criteria;
transmits a notification to a plurality of user devices, wherein the transmitted notification comprises the event data related to the selected first event;
receives a first set of responses from a first set of user devices of the plurality of user devices based on the transmitted notification, wherein the first set of user devices corresponds to participants of the selected first event;
transmits a request to each of a plurality of end-devices associated with a plurality of associates based on the received first set of responses and the selected first event, wherein
the request is for procurement of a set of resources required to host the selected first event,
each end-device of the plurality of end-devices is different from the plurality of user devices that corresponds to the participants of the selected first event, and
the plurality of associates is different from the participants of the selected first event;
receives confirmation information from one or more of the plurality of end-devices based on the transmitted request; and
transmits logistic information related to the selected first event to the first set of user devices, based on the received confirmation information.

2. The server according to claim 1, wherein the stored event data related to each event of the plurality of events comprises one or more of: a geo-location of an event, a title of the event, a type of the event, date-time information of the event, a plurality of resources required to host the event, or information about an organizer of the event.

3. The server according to claim 1, wherein the event selection criteria is based on at least one of: date-time information associated with each of the plurality of events, historical information associated with each of the plurality of events, or geo-location information associated with each of the plurality of events.

4. The server according to claim 3, wherein the historical information associated with each event of the plurality of events includes at least one of a feedback or rating of participants of a respective event hosted in a past, a revenue generated by the respective event hosted in the past, a number of the participants in the respective event hosted in past, a success or failure data generated for the respective event hosted in the past, or logistic data associated with the respective event hosted in the past.

5. The server according to claim 1, wherein the circuitry:
determines the plurality of user devices for participation in the selected first event based on user profile information; and
transmits the notification to the plurality of user devices associated with the determined plurality of user devices.

6. The server according to claim 1, wherein the circuitry further filters a second set of user devices from the first set of user devices for participation in the selected first event based on the received first set of responses.

7. The server according to claim 6, wherein the circuitry:
retrieves user profile information associated with each of the first set of user devices; and
filters the second set of user devices from the first set of user devices for the participation in the selected first event, further based on the retrieved user profile information and the event data associated with the selected first event.

8. The server according to claim 1, wherein the circuitry:
determines the set of resources from a plurality of resources required to host the selected first event based on the first set of responses received from the first set of user devices; and
generates the request for each of the plurality of end-devices based on the determined set of resources.

9. The server according to claim 1, wherein the transmitted request comprises one or more of: first information related to a number of participants for the selected first event, second information related to the set of resources required to host the selected first event, or the event data related to the selected first event.

10. The server according to claim 1, wherein the logistic information comprises one or more of: a geo-location of the selected first event, navigation information of the selected first event, date-time information of the selected first event, invitation information of the selected first event, or a first set of instructions for the selected first event.

11. The server according to claim 1, wherein the circuitry:
determines a geo-location of each of the first set of user devices and a geo-location of the selected first event;
generates navigational instructions to reach the geo-location of the selected first event based on the determined geo-location of each of the first set of user devices; and
transmits the generated navigational instructions to the first set of user devices.

12. The server according to claim 1, wherein the circuitry:
generates user participation information for each of the first set of user devices of the plurality of user devices, based on corresponding participation of the first set of user devices in the selected first even; and
updates the stored event data for the selected first event based on the generated user participation information.

13. The server according to claim 12, wherein the circuitry:
generates reward information for the first set of user devices based on the generated user participation information; and
transmits the generated reward information to the first set of user devices participated in the selected first event.

14. The server according to claim 12, wherein the generated user participation information for the first set of user devices comprises one or more of:
information about time spent at the selected first event, or purchasing information during the selected first event, wherein the purchasing information indicates a cost spent by a participant of the participants to purchase products or services in the first event.

15. The server according to claim 1, wherein the selected first event corresponds to one of: a community event, a social event, a sport event, an educational event, a health event, a corporate event, a business development event, a launch event, a trade-show event, or an award event.

16. A method, comprising:
in a server:
selecting a first event from a plurality of events, based on an event selection criteria;
transmitting a notification to a plurality of user devices, wherein the transmitted notification comprises event data related to the selected first event;
receiving a first set of responses from a first set of user devices of the plurality of user devices based on the transmitted notification, wherein the first set of user devices corresponds to participants of the selected first event;
transmitting a request to each of a plurality of end-devices associated with a plurality of associates based on the received first set of responses and the selected first event, wherein
the request is for procurement of a set of resources required to host the selected first event,
each end-device of the plurality of end-devices is different from the plurality of user devices that corresponds to the participants of the selected first event, and
the plurality of associates is different from the participants of the selected first event;
receiving confirmation information from one or more of the plurality of end- devices based on the transmitted request; and
transmitting logistic information related to the selected first event to the first set of user devices based on the received confirmation information.

17. The method according to claim 16, further comprising:
determining the plurality of user devices for participation in the selected first event based on user profile information; and
transmitting the notification to the plurality of user devices associated with the determined plurality of user devices.

18. The method according to claim 16, further comprising:
determining the set of resources from a plurality of resources required to host the selected first event based on the first set of responses received from the first set of user devices; and
generating the request for each of the plurality of end-devices based on the determined set of resources.

19. The method according to claim 16, further comprising:
determining a geo-location of each of the first set of user devices and a geo- location of the selected first event;
generating navigational instructions to reach the geo-location of the selected first event based on the determined geo-location of each of the first set of user devices; and
transmitting the generated navigational instructions to the first set of user devices.

20. A user device, comprising:
circuitry which:
receives, from a server, a notification which comprises event data which is related to a first event from a plurality of events, wherein the server selects the first event from the plurality of events based on an event selection criteria;
transmits, to the server, a response to participate in the selected first event based on the received notification, wherein the server:
receives the transmitted response from the user device;
transmits a request to each end-device of a plurality of end-devices of a plurality of associates based on the response and the selected first event, wherein
the request is for procurement of a set of resources required to host the selected first event,
each associate device of the plurality of end-devices is different from the user device,
the user device corresponds to a participant of the selected first event, and
each of the plurality of associates is different from the participant of the selected first event; and
receives, from the server, logistic information related to the selected first event, based on the transmitted response.

21. The user device according to claim 20, where the circuitry:
transmits, to the server, user profile information associated with the user device to the server; and
receives, from the server, the notification about the selected first event based on the transmitted user profile information.

* * * * *